(12) United States Patent
Peng et al.

(10) Patent No.: US 8,541,922 B2
(45) Date of Patent: Sep. 24, 2013

(54) MAGNETIC TRANSMISSION ASSEMBLY

(75) Inventors: Ming-Tsan Peng, Taoyuan County (TW); Li-Ju Cheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 287 days.

(21) Appl. No.: 12/904,946

(22) Filed: Oct. 14, 2010

(65) Prior Publication Data
US 2011/0215668 A1 Sep. 8, 2011

Related U.S. Application Data

(63) Continuation-in-part of application No. 12/763,751, filed on Apr. 20, 2010, now Pat. No. 8,188,629.

(30) Foreign Application Priority Data

| Mar. 3, 2010 | (TW) | 99106193 A |
| Apr. 19, 2010 | (TW) | 99112186 A |
| Aug. 25, 2010 | (TW) | 99128536 A |

(51) Int. Cl.
*H02K 1/00* (2006.01)
*H02K 3/00* (2006.01)
*H02K 19/26* (2006.01)
*H02K 21/00* (2006.01)
*H02K 23/46* (2006.01)

(52) U.S. Cl.
USPC ........... 310/190; 310/103; 310/191; 310/209; 310/104; 310/114

(58) Field of Classification Search
USPC .................. 310/190, 103, 191, 209, 104, 114
See application file for complete search history.

(56) References Cited

U.S. PATENT DOCUMENTS

| 2,959,041 A | 11/1960 | Scheller et al. |
| 3,889,140 A | 6/1975 | Baermann |

(Continued)

FOREIGN PATENT DOCUMENTS

| CN | 1304577 A | 7/2001 |
| CN | 1980016 A | 6/2007 |

(Continued)

OTHER PUBLICATIONS

Atallah et al., A Novel High-Performance Magnetic Gear, IEEE Transactions on Magnetics, Jul. 2001, vol. 37, No. 4.

(Continued)

*Primary Examiner* — Tran Nguyen
*Assistant Examiner* — Alex W Mok
(74) *Attorney, Agent, or Firm* — Morris Manning & Martin LLP; Tim Tingkang Xia, Esq.

(57) ABSTRACT

A magnetic transmission assembly is adapted to integration with a motor or generator. The magnetic transmission assembly includes a rotor, a stator, and a magnetically conductive element. The rotor and the stator are sleeved coaxially and respectively have R and ST1 pole pairs. The magnetically conductive element is located between the rotor and the stator, and has permeable regions. When the magnetically conductive element is actuated, the magnetically conductive element selectively enables PN1 or PN2 permeable regions to be corresponding to the rotor and the stator. The permeable regions corresponding to the rotor and the stator interact with magnetic fields of the R and ST1 pole pairs to generate a predetermined variable-speed ratio. The magnetic transmission assembly can be integrated into the motor, so as to improve the drive power density.

22 Claims, 16 Drawing Sheets

(56) References Cited

U.S. PATENT DOCUMENTS

| | | | |
|---|---|---|---|
| 3,980,937 A | 9/1976 | Bostrom et al. | |
| 4,027,229 A | 5/1977 | Frink | |
| 4,110,649 A | 8/1978 | Mas | |
| 4,578,609 A | 3/1986 | McCarty | |
| 4,766,362 A | 8/1988 | Sadvary | |
| 4,785,213 A | 11/1988 | Satake | |
| 4,885,493 A | 12/1989 | Gokhale | |
| 5,023,499 A | 6/1991 | Kuwahara | |
| 5,331,244 A * | 7/1994 | Rabe | 310/180 |
| 5,337,862 A * | 8/1994 | Kuwahara | 188/158 |
| 5,631,511 A | 5/1997 | Schulmann et al. | |
| 5,633,555 A | 5/1997 | Ackermann et al. | |
| 5,652,493 A | 7/1997 | Hendershot, Jr. | |
| 5,723,928 A * | 3/1998 | Imai et al. | 310/114 |
| 5,744,895 A * | 4/1998 | Seguchi et al. | 310/266 |
| 5,783,893 A * | 7/1998 | Dade et al. | 310/266 |
| 5,821,652 A | 10/1998 | Hyypio | |
| 5,821,710 A | 10/1998 | Masuzawa et al. | |
| 5,825,111 A | 10/1998 | Fei | |
| 5,856,719 A | 1/1999 | De Armas | |
| 6,380,653 B1 | 4/2002 | Seguchi | |
| 6,700,242 B2 | 3/2004 | Kawamura | |
| 6,720,692 B2 | 4/2004 | Bell | |
| 7,400,077 B2 | 7/2008 | Caroon | |
| 7,508,104 B2 | 3/2009 | Schmidt et al. | |
| 7,511,395 B2 | 3/2009 | Han et al. | |
| 7,598,648 B2 | 10/2009 | Fei | |
| 7,956,504 B2 | 6/2011 | Quere | |
| 7,982,353 B2 | 7/2011 | Wilson et al. | |
| 7,999,427 B2 | 8/2011 | Wilson et al. | |
| 2001/0005106 A1 | 6/2001 | Bell | |
| 2004/0135463 A1 | 7/2004 | Maguire et al. | |
| 2005/0040724 A1 | 2/2005 | Maguire et al. | |
| 2005/0104469 A1 | 5/2005 | Zepp et al. | |
| 2005/0121990 A1 | 6/2005 | Kaneko | |
| 2005/0212380 A1 | 9/2005 | Caroon | |
| 2007/0096574 A1 | 5/2007 | Romagny et al. | |
| 2007/0149335 A1 | 6/2007 | Strauss et al. | |
| 2008/0149445 A1 | 6/2008 | Kern et al. | |
| 2009/0072645 A1 | 3/2009 | Quere | |
| 2009/0127963 A1 | 5/2009 | Ai et al. | |
| 2009/0295250 A1 | 12/2009 | Nakanishi et al. | |

FOREIGN PATENT DOCUMENTS

| | | |
|---|---|---|
| CN | 101222172 A | 7/2008 |
| CN | 201328057 Y | 10/2009 |
| JP | 2003134773 | 5/2003 |
| WO | 2009147378 A1 | 12/2009 |
| WO | 2010017860 A1 | 2/2010 |

OTHER PUBLICATIONS

State Intellectual Property Office of the People's Republic of China, "Office Action", Jan. 5, 2013, China.

Japan Patent Office, "Office Action", Apr. 23, 2013, Japan.

* cited by examiner

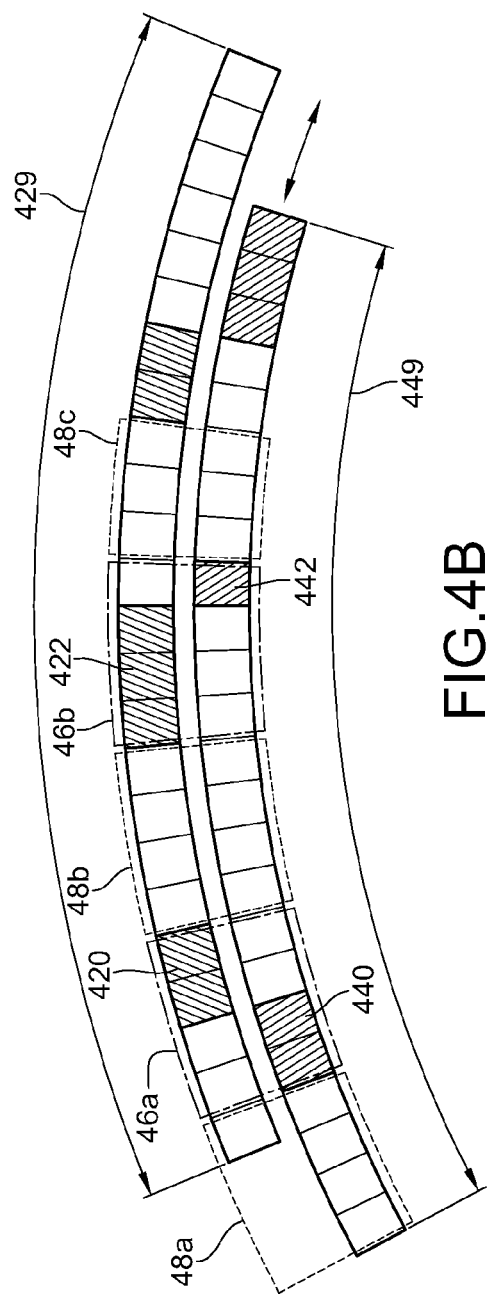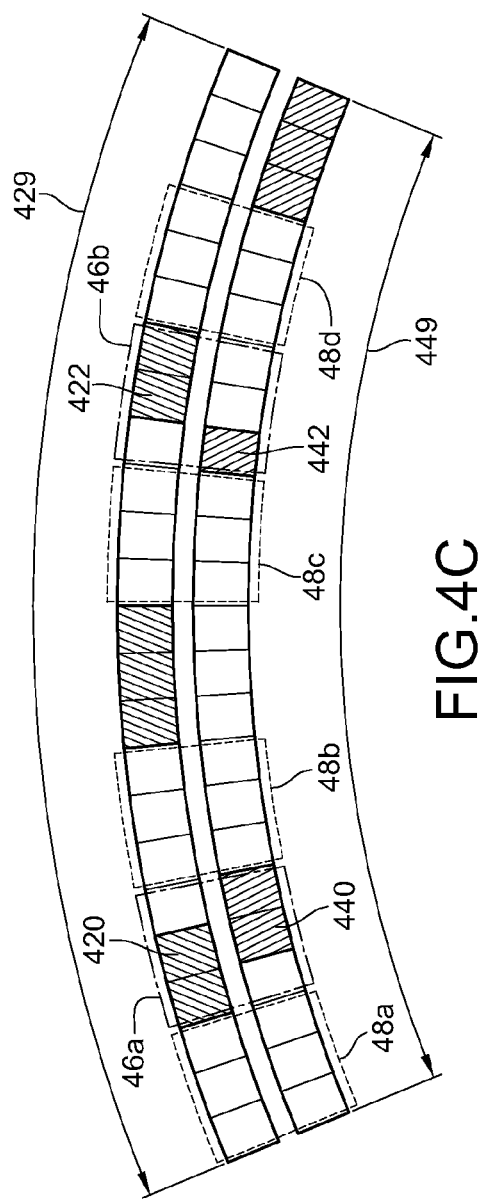
FIG.4B
FIG.4C

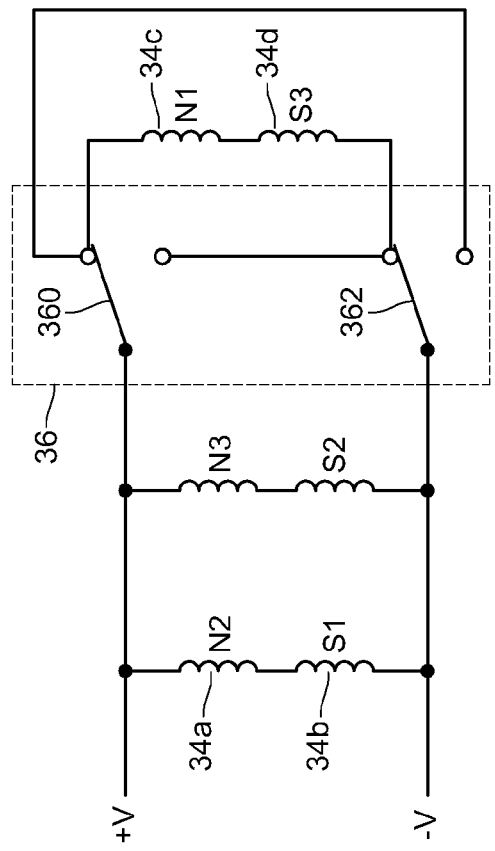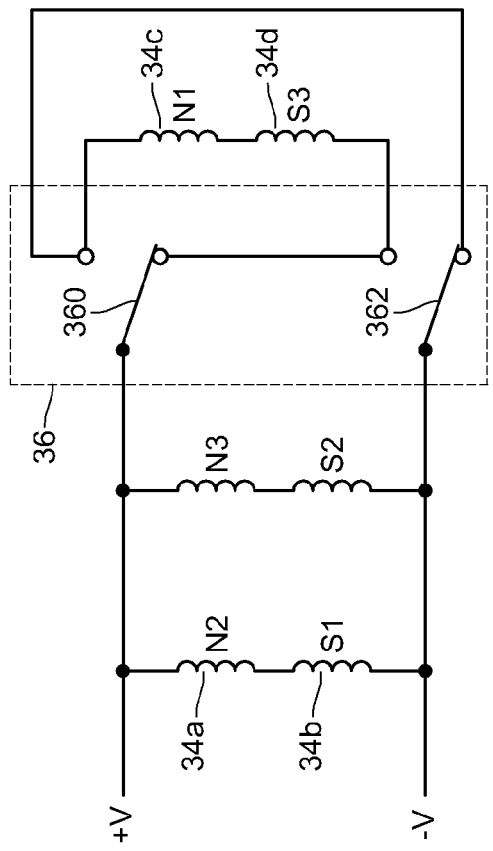

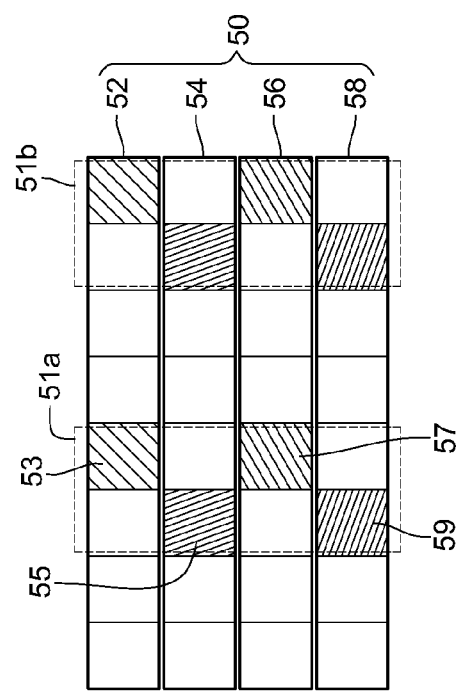
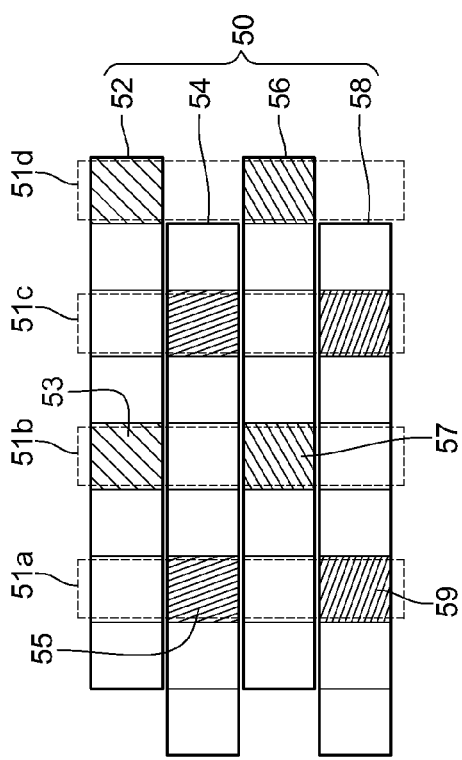

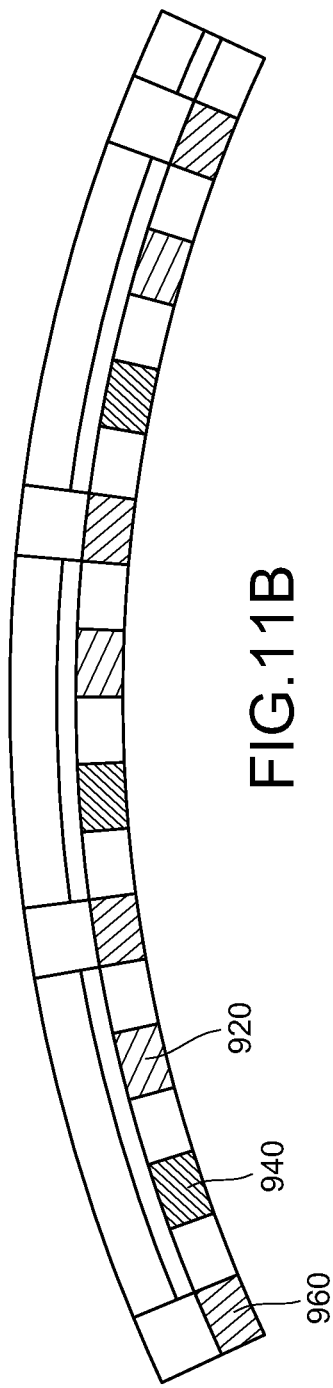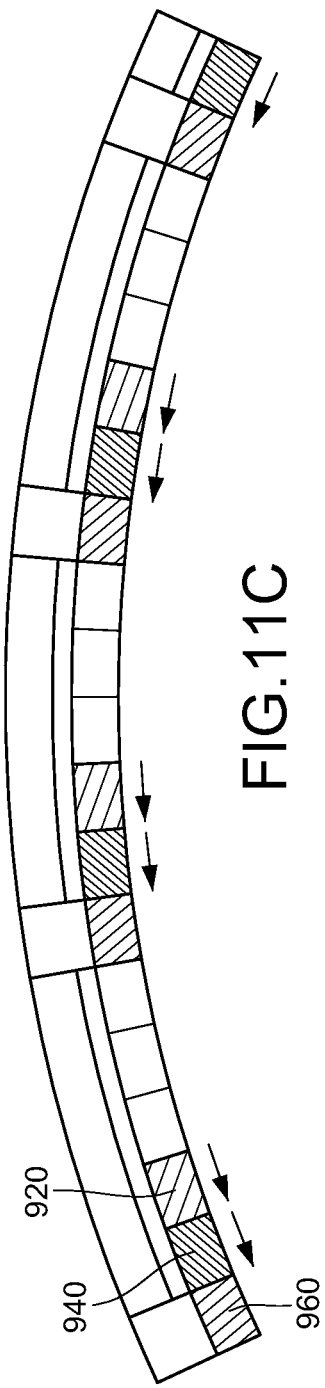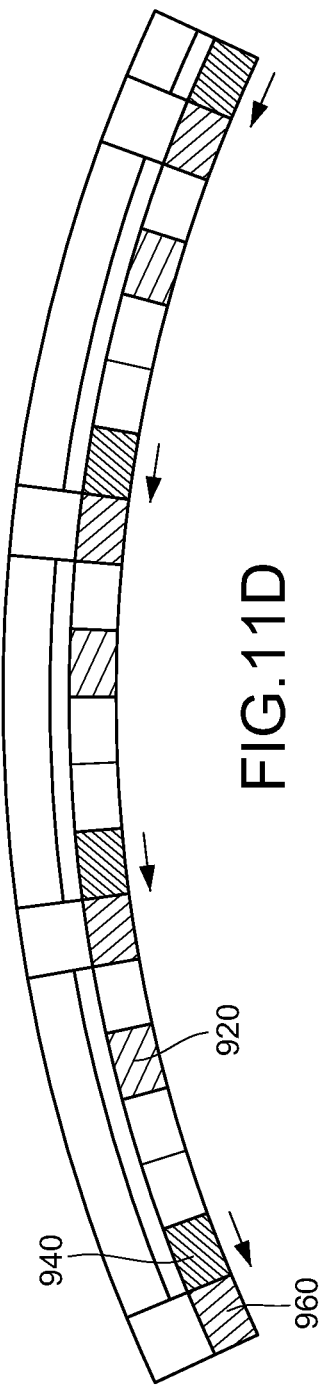

MAGNETIC TRANSMISSION ASSEMBLY

CROSS-REFERENCE TO RELATED APPLICATIONS

This non-provisional application claims priority under 35 U.S.C. §119(a) on Patent Application No. 099106193 filed in Taiwan, R.O.C. on Mar. 3, 2010, Patent Application No. 099112186 filed in Taiwan, R.O.C. on Apr. 19, 2010, and Patent Application No. 099128536 filed in Taiwan, R.O.C. on Aug. 25, 2010, as well as is a Continuation-in-part application of U.S. application Ser. No. 12/763,751, filed on Apr. 20, 2010, the entire contents of which are hereby incorporated by reference for which priority is claimed under 35 U.S.C. §120.

BACKGROUND

1. Field

The disclosure relates to a transmission assembly, and more particularly to a magnetic transmission assembly.

2. Related Art

A transmission device not only can be used for power transmission and delivery, but also has the function of accelerating or decelerating the rotation of a power source. Transmission devices applied in conventional automobile engines include mechanical and hydraulic gear boxes. Magnetic transmission devices are applied in electric or hybrid automobiles.

For technologies of variable speed motors, reference is made to U.S. Pat. No. 3,980,937 entitled "Fractional Horsepower Gear Motor" issued on Sep. 14, 1976, in which a power output by a motor is transmitted through a mechanical gear assembly so as to achieve torque conversion and transmission.

In addition, U.S. Pat. No. 5,825,111 entitled "Single-phase induction motor 4/6 pole common winding connection with magnetic motive force symmetrically distributed" issued on Dec. 20, 1998, and U.S. Pat. No. 7,598,648 entitled "2/6 pole single-phase induction motor having shared windings" issued on Dec. 6, 2009, disclose methods of achieving variable speed transmission by changing the number of poles of a stator of a induction motor.

For technologies related to magnetic transmission device, reference is made to an article "A Novel High-Performance Magnetic Gear" (IEEE Transactions on Magnetics, Vol. 37, No. 4, July, 2001) by K. Atallah and D. Howe.

The mechanical transmission device has disadvantages of high noise level and heavy weight. Although the ordinary magnetic transmission device has reduced vibration and noise level, its weight also cannot be reduced. Moreover, when applied in an electric automobile, an electric motor not only needs to meet the requirements of different output torques and travel speeds, but also needs to meet the requirements of high performance operation. Accordingly, the motor is usually combined with a transmission device. In such a combination, it is quite difficult to improve the overall drive power density of the motor and the transmission device (due that the total weight of the motor and the transmission device is heavy).

SUMMARY

In view of the above problems, a magnetic transmission assembly is disclosed. The magnetic transmission assembly can be easily integrated into a motor (such as an electric motor) or generator to achieve a light weight design. The integrated motor improves the drive power density.

According to an embodiment, a magnetic transmission assembly comprises a rotor, a stator, and a magnetically conductive element (or called as permeable element). The rotor is sleeved coaxially with the stator. The rotor has a plurality of poles and R pole pairs. The stator has a plurality of poles and ST1 pole pairs. The magnetically conductive element is located between the rotor and the stator and has a plurality of permeable regions. When the magnetically conductive element is actuated, the magnetically conductive element selectively makes PN1 or PN2 permeable regions correspond to the rotor and the stator, where $PN1-3 \leq R+ST1 \leq PN1+3$, and $PN2-3 \leq R+ST1 \leq PN2+3$.

According to an embodiment of the magnetically conductive element, the magnetically conductive element comprises a first ring and a second ring. The first ring and the second ring are axially connected. The first ring has PN1 permeable blocks. The second ring has PN2 permeable blocks. When the magnetically conductive element is axially actuated, the magnetically conductive element selectively enables the first ring or the second ring to be moved to a position between the rotor and the stator.

According to a second embodiment of the magnetically conductive element, the magnetically conductive element comprises a first ring and a second ring. The first ring is disposed on a radial outer side of the second ring. The first ring and the second ring are disposed between the stator and the rotor. When the magnetically conductive element is actuated, the first ring and the second ring move relatively between a first position and a second position. When the first ring and the second ring are located at the first position, the magnetically conductive element has PN1 permeable regions. When the first ring and the second ring are located at the second position, the magnetically conductive element has PN2 permeable regions.

According to another embodiment, the stator comprises a plurality of induction coils and a pole number modulation circuit. The induction coils are energized to form the poles, and the pole number modulation circuit selectively switches the induction coils to the ST1 pole pairs and ST2 pole pairs. Here, $PN2-3 \leq R+ST2 \leq PN2+3$.

According to still another embodiment, a magnetic transmission assembly comprises a rotor, a stator and a magnetically conductive element. The stator has a plurality of poles and the poles have R pole pairs. The stator is sleeved coaxially with the rotor and has a plurality of poles. The poles of the stator have ST1 pole pairs. The magnetically conductive element is disposed between the rotor and the stator and has PN1 permeable regions. The PN1 permeable regions correspond to the rotor and the stator. $PN1-3 \leq R+ST1 \leq PN1+3$.

As mentioned above, the magnetically conductive element is disposed between the stator and the rotor, and the magnetically conductive element is capable of selectively changing the number of the permeable regions (accordingly, also capable of changing the number of magnetic gaps). Accordingly, the magnetic transmission assembly can generates different variable-speed ratios (ratios of the rotation rate of the stator to the rotation rate of the rotor) between the stator and the rotor. Moreover, in another embodiment, the stator is designed to have variable pole pairs, such that different variable-speed ratios can also be achieved by combining the permeable element with the rotor. The permeable element, the stator and the rotor may each have a hollow annular shape, such that the entire magnetic transmission assembly has small volume and weight, and can be easily integrated into an electric motor. Consequently, the drive power density (W/Kg or W/m³) of the integrated motor is increased.

These and other aspects of the disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The disclosure will become more fully understood from the detailed description given herein below for illustration only, and thus are not limitative of the disclosure, and wherein:

FIG. 4B is a partially enlarged cross-sectional view of a first embodiment of the magnetically conductive element of FIG. 4A;

FIG. 4C is another partially enlarged cross-sectional view of the first embodiment of the magnetically conductive element of FIG. 4A;

FIG. 5A is a schematic winding diagram of another embodiment of the stator of the magnetic transmission assembly according to the disclosure;

FIG. 5B is a schematic view illustrating operation of the embodiment of the stator of FIG. 5A;

FIGS. 7A, 7B, and 7C are schematic views of a second embodiment of the magnetically conductive element of the magnetic transmission assembly according to the disclosure;

FIGS. 11B and 11C are respectively a partial cross-sectional view of FIG. 11A along Line 11B-11B and a schematic state diagram;

FIG. 11D is another schematic state diagram of FIG. 11B; and

DETAILED DESCRIPTION

Figure 1:
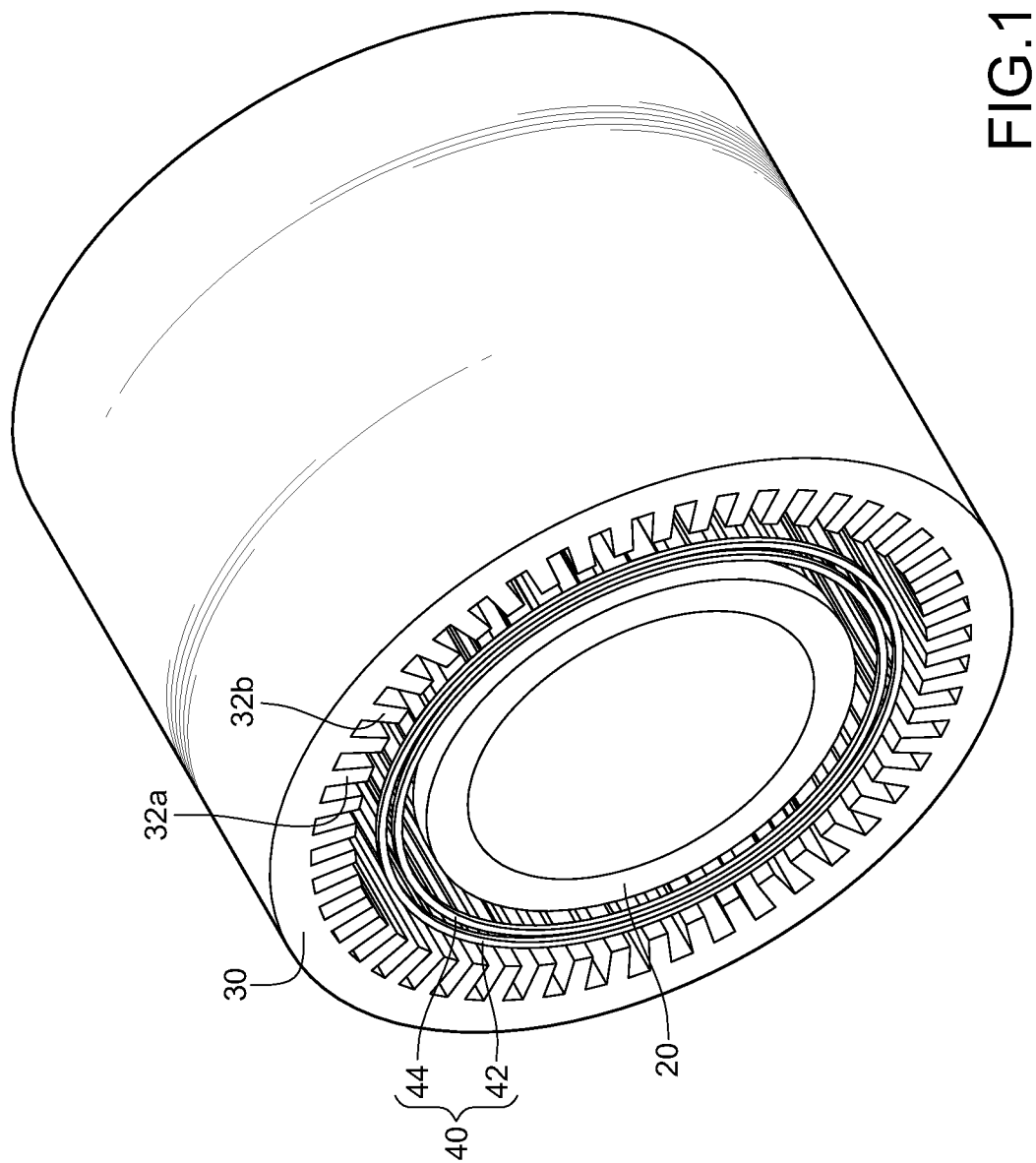
FIG. 1 is a three-dimensional schematic structural view of a first embodiment of a magnetic transmission assembly according to the disclosure.
Figure 2:
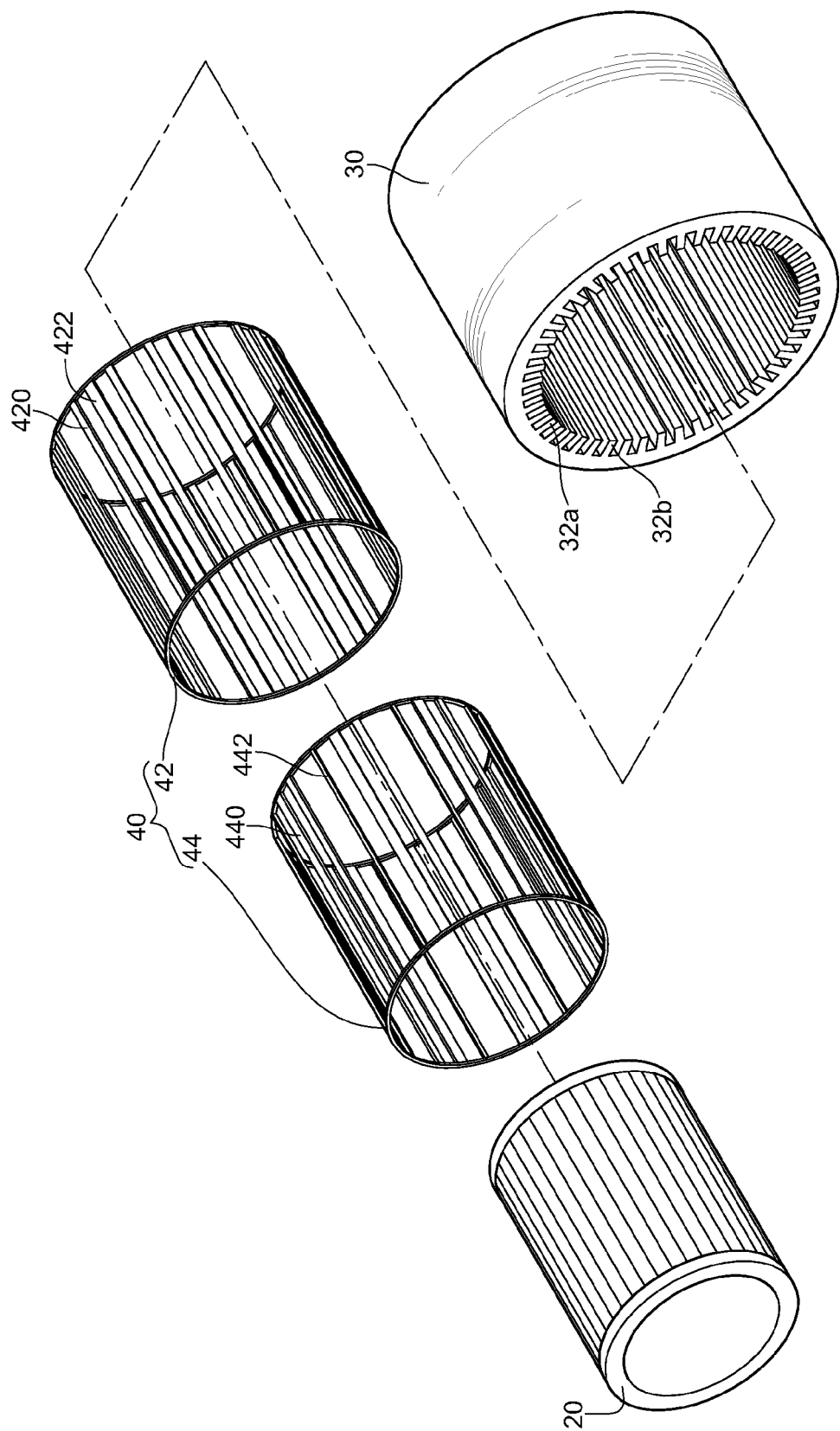
FIG. 2 is a three-dimensional schematic exploded view of the first embodiment of the magnetic transmission assembly according to the disclosure.

FIGS. 1 and 2 are respectively a three-dimensional schematic structural view and a three-dimensional exploded view according to an embodiment of the disclosure. As can be seen from the figures, a magnetic transmission assembly comprises a rotor 20, a stator 30, and a magnetically conductive element 40 (also referred to as a magnetic transmission element). The magnetic transmission assembly is suitable for integration with a motor (such as an electric motor) or generator. For example, if the magnetic transmission assembly is integrated with an electric motor of an electric automobile, and a motor driver outputs an electricity to the magnetic transmission assembly, the magnetic transmission assembly can generate a rotary power at the rotor, and at the same time, the motor driver properly controls the variable-speed ratio of the magnetic transmission assembly, such that the magnetic transmission assembly can output different powers (power=output torque×rotation rate). Since the magnetic transmission assembly has the functions of both a motor and a transmission device, the total volume and weight are low, such that a high drive power density can be obtained. Here, the drive power density may be, but not limited to, output power/volume or output power/weight (that is, output torque×rotation rate)/volume, or (output torque×rotation rate)/weight). In addition, if the magnetic transmission assembly is applied in a motor, the rotor 20 receives the rotary power, and thus coils (to be detailed below) of the stator 30 can output an electric power generated by cutting the magnetic field. The electric power may be transmitted to a rectification and voltage regulation circuit and then output. Since the magnetic transmission assembly may be controlled to generate the variable-speed ratio, a controller may be used to adjust the variable-speed ratio of the magnetic transmission assembly when the input rotary power is significantly changed or it is intended to obtain better system conversion efficiency.

Figure 3:
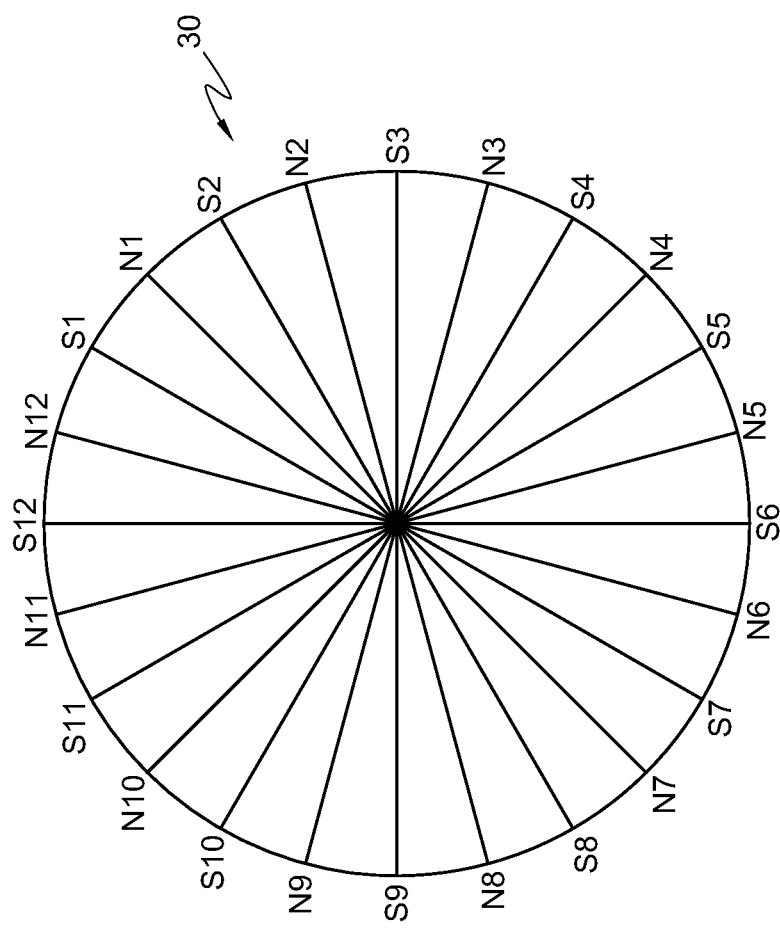
FIG. 3 is a schematic view illustrating pole pairs of a stator of the first embodiment of the magnetic transmission assembly according to the disclosure.

Referring to FIGS. 1 and 2, the stator 30 may be a fixed magnet or an induction magnet (or referred to as an electromagnet), and in this embodiment, the induction magnet is taken as an example. A plurality of bumps 32a, 32b is annularly disposed on an inner side of the stator 30. Induction coils (to be detailed below) are wound around the bumps 32a, 32b, and the induction coils are energized to form poles. Taking the embodiment as shown in the figures, the stator 30 has 48 bumps 32a, 32b, and each of the bumps 32a, 32b can be energized to form one pole pair. In this embodiment, 4 phases exist, each having 12 pole pairs. FIG. 3 is a schematic view illustrating pole pairs of a stator 30 according to an embodiment of the disclosure. As can be seen from the figure, neighboring poles have opposite polarities (north magnetic pole N and south magnetic pole S). Two neighboring poles having opposite polarities form a pole pair (for example, S1 and N1 form a pole pair as shown in the figure). As can be seen from the figure, a total of 12 pole pairs exists, which is merely an implementation, and the disclosure is not limited thereto, and the number of the pole pairs is represented by ST1.

The rotor 20 may be may be a fixed magnet or an induction magnet, and in this embodiment, the rotor 20 is illustrated by taking the fixed magnet as an example. The rotor 20 has a plurality of poles and R pole pairs, and in this embodiment, the rotor 20 has, for example, 20 pole pairs. The stator 30 and the rotor 20 are disposed coaxially (sleeved coaxially), and in this embodiment, the rotor 20 is disposed on a radial inner side of the stator 30, but the disclosure is not limited thereto. The objectives of the disclosure can also be achieved by disposing the stator 30 on a radial inner side of the rotor 20. In addition, the direction of the poles (magnetic field lines) of the rotor 20 is in the direction of the poles (magnetic field lines) of the stator 30.

The permeable element 40 may be laminated steel, and the material thereof may be a soft magnetic composite (SMC), so as to reduce eddy current and iron loss.

Referring to FIGS. 1 and 2, the magnetically conductive element 40 comprises a first ring 42 (or called as first sleeve) and a second ring 44 (or called as second sleeve). The first ring 42 is located on a radial outer side of the second ring 44, and the first ring 42 and the second ring 44 are disposed between the stator 30 and the rotor 20. The first ring 42 and the second ring 44 are in contact with each other or separated from each other by a space (the latter is implemented in the figure). The first ring 42 has a plurality of permeable blocks 420, 422 (or called as magnetically conductive blocks). The second ring 44 also has a plurality of permeable blocks 440, 442. When the first ring 42 is located on the radial outer side of the second ring 44, the permeable blocks 420, 422, 440, 442 form a plurality of permeable regions (to be detailed below). When the first ring 42 or/and the second ring 44 are actuated, the first ring 42 and the second ring 44 move relatively (rotate relatively) between a first position and a second position, and at this time, the number of the permeable regions is changed accordingly, which is illustrated as follows.

Figure 4A:
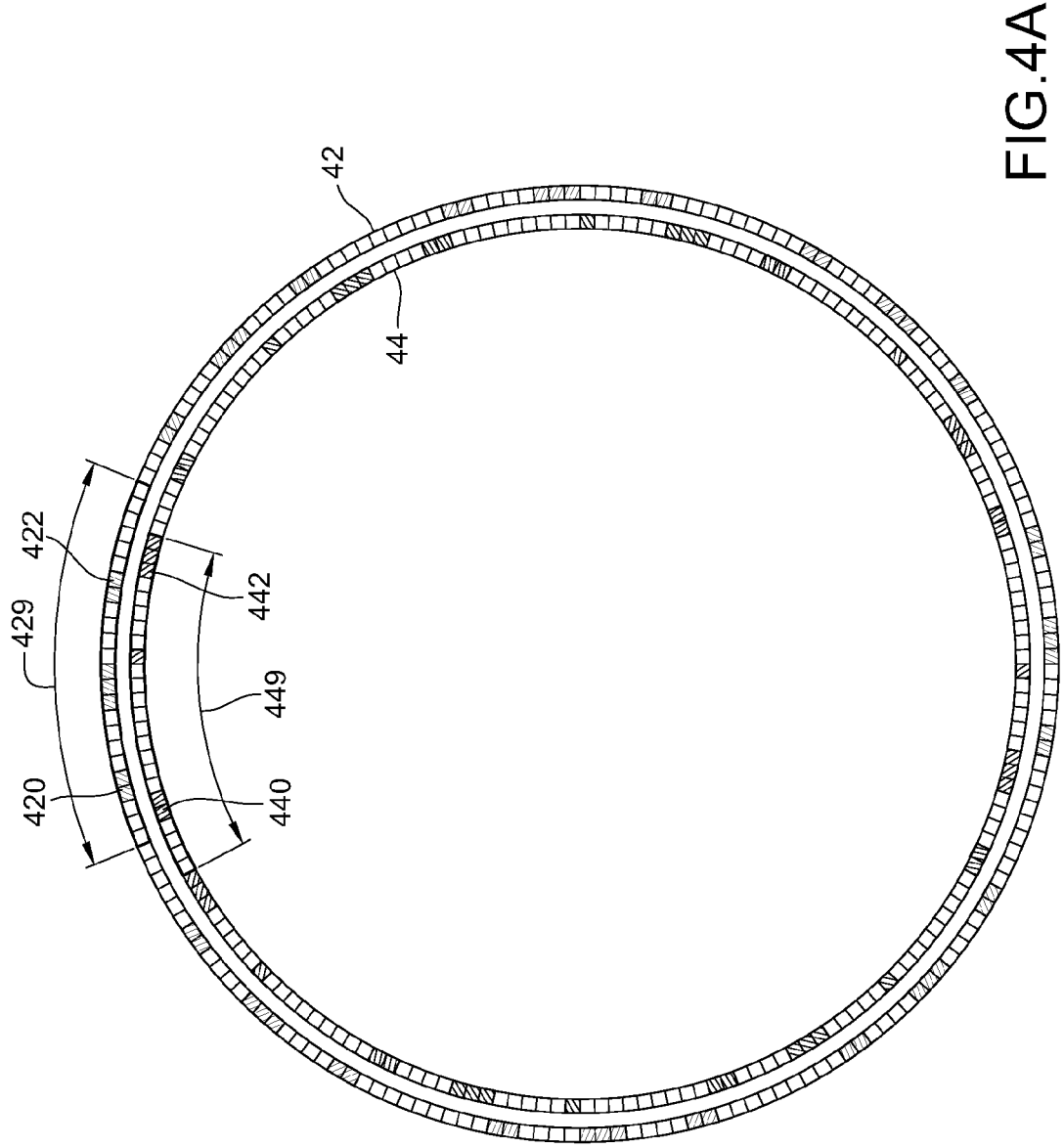
FIG. 4A is a cross-sectional view of a magnetically conductive element of the first embodiment of the magnetic transmission assembly according to the disclosure.

FIG. 4A is a cross-sectional view of a first embodiment of a magnetically conductive element according to an embodiment of the disclosure, which is taken along a plane perpendicular to an axial direction after the first ring 42 is sleeved on the radial outer side of the second ring 44 in FIG. 2. For ease of illustration of the relative rotation of the first ring 42 and the second ring 44, arc segments marked 429 and 449 in FIG. 4A are enlarged in FIG. 4B. The arc segments 429, 449 subtend an angle of 45°, so the first ring 42 and the second ring 44 have 8 arc segments 429, 449 in total. FIG. 4B is a partially enlarged cross-sectional view when the first ring 42 and the second ring 44 are located at the first position. FIG. 4C is a partially enlarged cross-sectional view when the first ring 42 and the second ring 44 are located at the second position.

As can be seen from FIG. 4B, the permeable block 420 of the first ring 42 and the permeable block 440 of the second ring 44 are in a connection state (or overlap) and form the permeable region 46a. Likewise, the permeable block 422 of the first ring 42 and the permeable block 442 of the second ring 44 are in a connection state and form the permeable region 46b. Three magnetic gaps 48a, 48b, 48c are formed between the permeable regions 46a, 46b. Since the first ring 42 and the second ring 44 have four equal 8 arc segments 429, 449, the first ring 42 and the second ring 44 have 24 magnetic gaps 48a, 48b, 48c in total (3×8=24, that is, have 24 permeable regions 46a, 46b).

Referring to FIG. 4C, a partially enlarged cross-sectional view when the first ring 42 and the second ring 44 are located at the second position is shown. The permeable block 420 of the first ring 42 and the permeable block 440 of the second ring 44 are in a connection state and form the permeable region 46a. Likewise, the permeable block 422 of the first ring 42 and the permeable block 442 of the second ring 44 are in a connection state and form the permeable region 46b. As can be seen from the figure, the arc segments 429, 449 have four magnetic gaps 48a, 48b, 48c, 48d therein, and also have four permeable regions 46a, 46b. Therefore, the first ring 42 and the second ring 44 have 32 (4×8=32) magnetic gaps 48a, 48b, 48c, 48d in total.

The connection state between the permeable blocks 420, 440 refers to a close distance there-between, instead of referring to a contact state, and the close distance may also mean that the permeable blocks 420, 440 are not in contact but overlap each other in a radial direction, or the permeable blocks 420, 440 are not in contact but are separated by a space in a radial direction or in a circumferential direction. In other words, if the permeable blocks 420, 440 are not in contact, two distances exist between the permeable blocks 420, 440: one is a radial distance, and the other is a circumferential distance. As for the radial distance, it has been found through experiments that a single permeable region 46a can be formed, as long as the radial distance is less than 5 mm. Definitely, the distance is also related to the intensity of the magnetic field lines of the stator 30, and the higher the intensity of the magnetic field lines is, the larger the distance may be. That is to say, the radial distance may be changed according to the size of the motor and the intensity of the magnetic field lines.

The circumferential distance (arc length) may also be expressed as an angle between borders of the permeable blocks 420, 440 at a center of circle (center of the stator), for example, an angle between a left side edge of the permeable block 420 and a right side edge of the permeable block 440 as shown in FIG. 4B. In order to further define the angle or arc length, a space formed by a distance between the left side edge of the permeable block 420 and the right side edge of the permeable block 440 is defined as an air slot. When the magnetic transmission assembly operates, each of the magnetic gaps 48a, 48b, 48c (FIG. 4B) will generate a pole (referred to as an air gap pole below), and when the permeable blocks 420, 440 has an air slot, the air slot will also have a pole (referred to as an air slot pole below). In this case, in order to enable the permeable blocks 420, 440 to form the permeable region 46a, the magnetic intensity of the air slot pole is preferably smaller than 20% of the magnetic intensity of the air gap pole. Then, the arc length or the angle derived from the magnetic intensity of the air slot pole is a preferred circumferential distance.

The material of the permeable blocks 420, 422, 440, 442 may be any permeable material, for example, an iron-based material or soft iron. The relative rotation of the first ring 42 and the second ring 44 may be driven by a mechanical or electromagnetic method. In the driving method, the first ring 42 or the second ring 44 may be separately driven, or the first ring 42 and the second ring 44 may be concurrently driven, as long as the relative positions of the first ring 42 and the second ring 44 can be moved between the first position and the second position.

It can be known from the illustration of FIGS. 4B and 4C that, when the magnetically conductive element 40 is actuated, the first ring 42 and the second ring 44 move relatively between the first position (position of FIG. 4B) and the second position (position of FIG. 4C), and when the first ring 42 and the second ring 44 are located at the first position, the magnetically conductive element 40 has 24 (referred to as PN1 below) permeable regions 46a, 46b, and when the first ring 42 and the second ring 44 are located at the second position, the magnetically conductive element 40 has 32 (referred to as PN2 below) permeable regions 46a, 46b.

By designing the first ring 42 and the second ring 44 of the magnetically conductive element 40 to be capable of relative movement, the magnetically conductive element 40 can selectively enable the PN1 or PN2 permeable regions 46a, 46b to be corresponding to the rotor 20 and the stator 30. By combining the PN1 or PN2 permeable regions 46a, 46b with the magnetic field of the rotor 20 and the magnetic field of the stator 30, an acceleration or deceleration (transmission) effect can be generated. The acceleration ratio or deceleration ratio can be obtained by the following Equation (1):

$$G = \frac{mp}{|mp+kn|} \quad \text{Equation (1)}$$

In the equation, G is the variable-speed ratio (that is, the acceleration to deceleration ratio), m and k are stages of harmonics, p is the number of pole pairs of the rotor 20, and n is the number of the permeable regions 46a, 46b (number of steel pieces). For fundamental harmonics, m=−k=1, and in this embodiment, the number of the pole pairs of the rotor 20 is 20. Taking the case that the first ring 42 and the second ring 44 are located at the first position as an example, the number of the permeable regions is 24. By substituting the numbers into the above equation, it can be obtained that G=(1×20)/(1×24−1×20)=5, that is, the ratio of the rotation rate of the stator to the rotation rate of the rotor is 5:1. If the case that the first ring 42 and the second ring 44 are located at the second position is taken as an example, the number of the permeable regions is 32. By substituting the numbers into the above equation, it can be obtained that G=(1×20)/(1×32−1×20)=1.6, that is, the ratio of the rotation rate of the stator to the rotation rate of the rotor is 1.6:1.

As can be seen from the above, through suitable configuration and design of the magnetically conductive element 40, the stator 30 and the rotor 20, the magnetic transmission assembly can be enabled to have a transmission effect.

In addition, in order to further improve the stability of the variable-speed ratio, it can be obtained through experiments that if the number ST1 of the pole pairs of the stator 30, the number R of the pole pairs of the rotor 20, and the numbers PN1 and PN2 of the permeable regions 46a, 46b of the magnetically conductive element 40 are maintained in the following relation, stable variable-speed ratio and driving force can be obtained:

$$PN1-3 \leq R+ST1 \leq PN1+3 \quad \text{Equation (2)}$$

$$PN2-3 \leq R+ST1 \leq PN2+3 \quad \text{Equation (3)}$$

Taking this embodiment as an example, when the magnetically conductive element 40 is located at the second position, the Equation (3) PN2−3≦R+ST1≦PN2+3 is satisfied, and when the magnetically conductive element 40 is located at the first position, the requirements of transmission can be met, though the Equation (2) PN1−3≦R+ST1≦PN1+3 is not satisfied. In this embodiment, if it is intended to satisfy the Equations (2) and (3) at the same time, the design of the permeable blocks 420, 422, 440, 442 of the magnetically conductive element 40 may be modified to satisfy the Equation (2). For example, if ST1 is 12, and PN1 and PN2 are respectively 35 and 29, and the above Equations (2) and (3) can be satisfied at the same time.

In this embodiment, if it is intended to satisfy the Equations (2) and (3) at the same time without modifying the design of the magnetically conductive element 40 (but the Equation (3) needs to be slightly changed, to be detailed below), an embodiment of the stator 30 of FIGS. 5A and 5B can be used. FIG. 5A is a schematic winding diagram of another embodiment of the stator 30 of the magnetic transmission assembly according to the disclosure, and FIG. 5B is a schematic view illustrating operation of the embodiment of the stator 30 of FIG. 5A.

Figure 6:
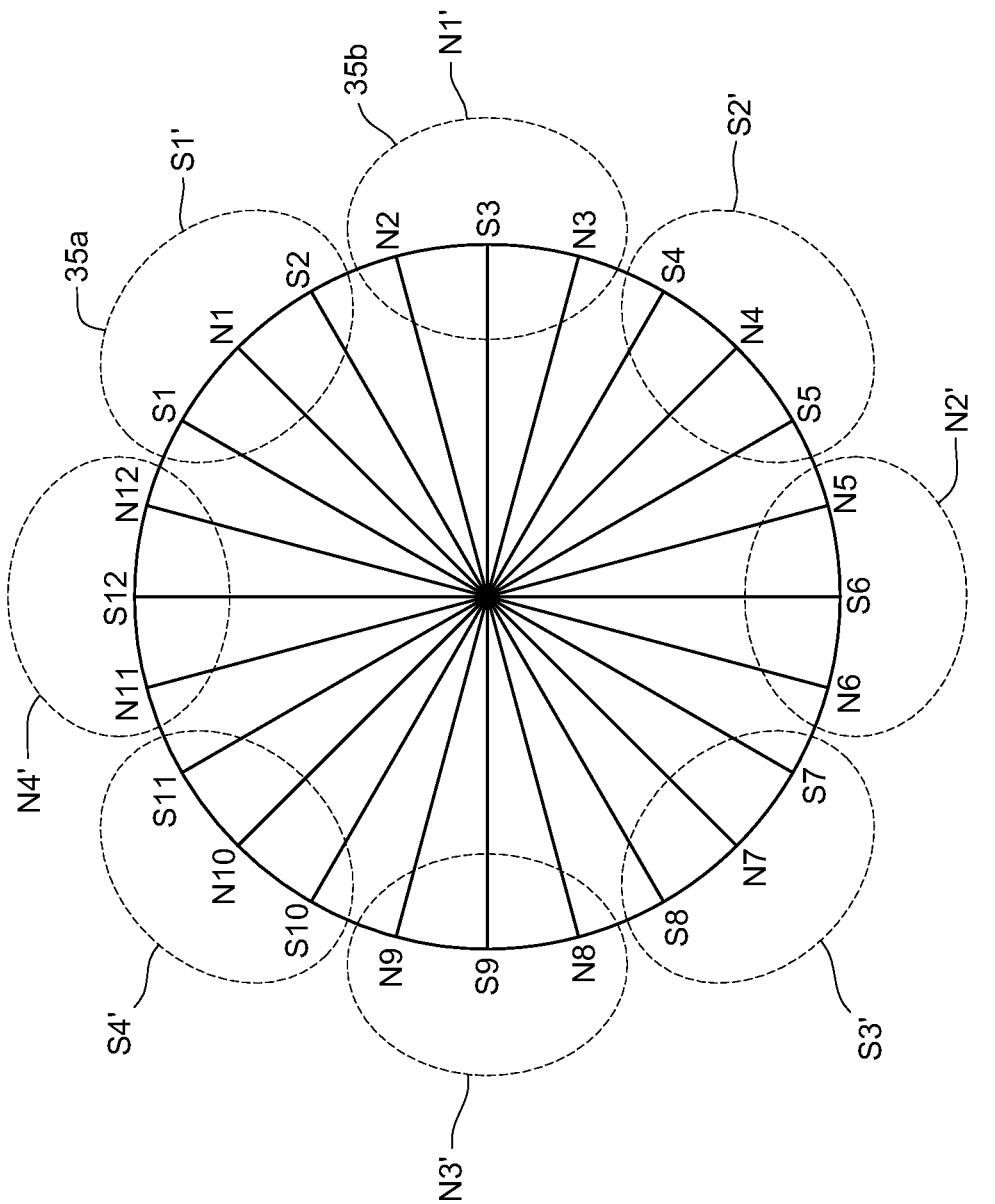
FIG. 6 is a schematic view illustrating switching of pole pairs between FIGS. 5A and 5B.

As can be seen from the figures, another embodiment of the stator 30 comprises a plurality of induction coils 34a, 34b, 34c, 34d and a pole number modulation circuit 36. The induction coils 34a, 34b, 34c, 34d are respectively wound about the bumps 32a, 32b. FIGS. 5A and 5B only depict the induction coils 34a, 34b, 34c, 34d of three pole pairs (N1, N2, N3, S1, S2, S3), but it is not intended that the stator 30 only comprises the coils 34a, 34b, 34c, 34d. The pole number modulation circuit 36 comprises two switches 360, 362. When the switches 360, 362 are in a state as shown in FIG. 5A and are connected to a power supply, the poles formed by the induction coils 34a, 34b, 34c, 34d present polarities as shown in FIG. 3, that is, the stator 30 has 12 pole pairs in total. When the switches 360, 362 are in a state as shown in FIG. 5B and are connected to a power supply, the induction coils 34c, 34d that originally form N1, S3 will form opposite poles due to the inversely connected power supply (that is, N1 is changed to a south magnetic pole, and S3 is changed to a north magnetic pole). FIG. 6 is a schematic view illustrating switching of pole pairs between FIGS. 5A and 5B.

As can be seen from the figure, dashed line blocks represent schematic views of polarities of poles formed when the switches 360, 362 are in the state as shown in FIG. 5B. In the figure, N1, N4, N7, N10 are north magnetic poles in FIG. 5A, and S3, S6, S9, S12 are south magnetic poles in FIG. 5A, and at this time, the stator 30 has 12 (referred to as ST1 below) pole pairs in total (that is, N1, S1, N2, S3 . . . N12, S12). However, in FIG. 5B, due to the skillful design of the switches 360, 362 and circuits, the N1, N4, N7, N10 are changed into south magnetic poles after being energized, and S3, S6, S9, S12 are changed into north magnetic poles, with the other poles remaining unchanged; therefore, the stator 30 has 4 (referred to as ST2 below) pole pairs in total (as shown by dashed line blocks N1', S1', N2', S2', N3', S3', N4', S4'. In other words, when the induction coils 34a, 34b, 34c, 34d are switched to the ST1 pole pairs, the neighboring induction coils 34a, 34b, 34c, 34d have opposite polarities (magnetic polarities), and when the induction coils 34a, 34b, 34c, 34d are switched to the ST2 pole pairs, the induction coils 34a, 34b, 34c, 34d are grouped into a plurality of coil groups 35a, 35b, and the neighboring coil groups 35a, 35b have opposite polarities. In this embodiment, each of the coil groups 35a, 35b comprises three sequentially neighboring induction coils 34a, 34b, 34c, 34d. Here, the term "sequentially neighboring" means "connected", and for example, S1, N1, and S2 in FIG. 5B belong to the sequentially neighboring induction coils 34a, 34b, 34c, 34d.

Based on the above, the stator 30 is capable of selectively switching the induction coils 34a, 34b, 34c, 34d to 12 (ST1) pole pairs and 4 (ST2) pole pairs through the pole number modulation circuit 36. After the embodiment of the stator 30 of FIG. 5A is integrated with the switching of the number of the permeable regions of the magnetically conductive element 40, the variable-speed ratio (ratio of the rotation rate of the stator to the rotation rate of the rotor) can be obtained as shown in the following table, and the above Equation (2) and the following Equation (4) can be satisfied.

$$PN2-3 \leq R+ST2 \leq PN2+3 \quad \text{Equation (4)}$$

|  | The magnetically conductive element is located at the first position, and the pole number modulation circuit is in the state as shown in FIG. 5B Variable-speed ratio (5:1) | The magnetically conductive element is located at the second position, and the pole number modulation circuit is in the state as shown in FIG. 5A Variable-speed ratio (1.6:1) |
|---|---|---|
| Stator | 4 | 12 |
| Magnetically conductive element | 24 | 32 |
| Rotor | 20 | 20 |

Although the pole number modulation circuit 36 merely takes the embodiment of FIG. 5A as an example, the disclosure is not limited thereto. Through a proper circuit and switch design, the number of the pole pairs of the stator 30 may be increased or reduced at different ratios. In addition, the stator 30 may be wound using more complex and diversified designs, for example, using a winding chart, so as to meet more diversified requirements of pole pairs, and the winding mode may be, but not limited to, Lucas, Retzbach and Kühfuss (LRK) winding, distributed LRK (D-LRK) winding, or ABC winding, which will be detailed below.

Figure 7C:
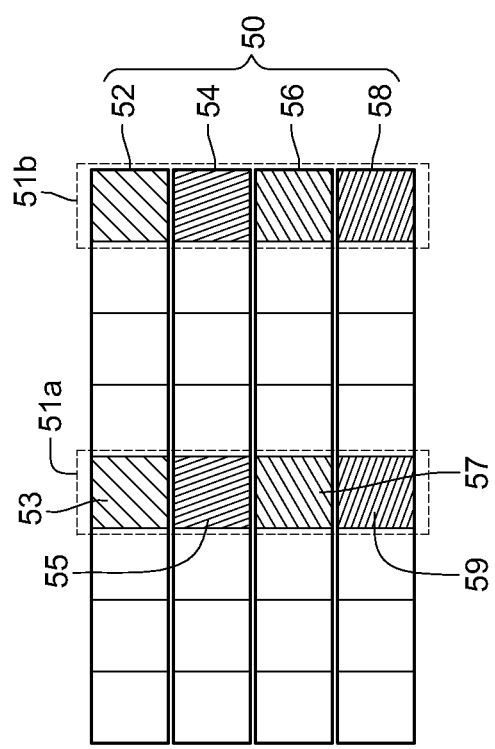
Figure 8:
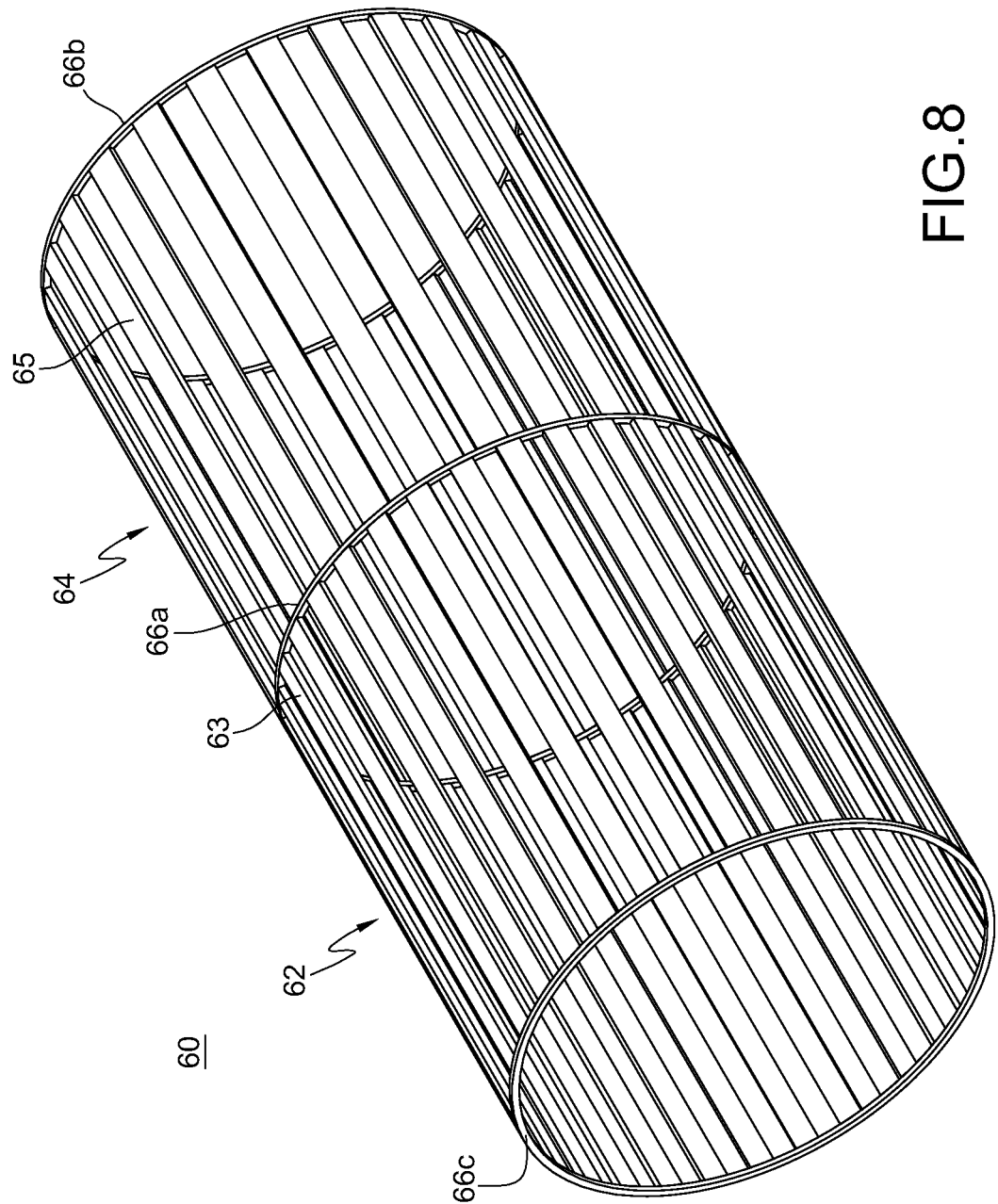
FIG. 8 is a schematic view of a third embodiment of the magnetically conductive element of the magnetic transmission assembly according to the disclosure.

For other embodiments of the magnetically conductive element 40 of FIG. 4A, reference may be made to FIGS. 7A, 7B, and 8. The magnetically conductive element 50 of FIGS. 7A, 7B, and 7C (the second embodiment) is similar to that in FIG. 4B. As can be seen from the figures, the magnetically conductive element 50 comprises a first ring 52, a second ring 54, a third ring 56, and a fourth ring 58. The first ring 52, the second ring 54, the third ring 56, and the fourth ring 58 overlap each other in a radial direction and respectively have permeable blocks 53, 55, 57, 59 (also referred to as first, second, third, and fourth permeable blocks). When the magnetically conductive element 50 is located at a position of FIG. 7A (the first position), the permeable blocks 53, 55, 57, 59 are in a connection relation, such that the arc segment has two permeable regions 51*a*, 51*b* and two magnetic gaps (the magnetic gap is a gap spaced by the permeable regions in a circumferential direction). When the magnetically conductive element 50 is located at a position of FIG. 7B (the second position), the permeable blocks 53, 55, 57, 59 are separated from each other, such that the arc segment has four permeable regions 51*a*, 51*b*, 51*c*, 51*d* and four magnetic gaps. In addition, when the permeable element 50 is located at a position of FIG. 7C (also referred to as a third position), the permeable blocks 53, 55, 57, 59 completely overlap each other in the radial direction, and at this time, the magnetically conductive element 50 has two permeable regions 51*a*, 51*b* and two magnetic gaps. When the permeable element 50 is located at the positions of FIG. 7A and FIG. 7C, although the same number of permeable regions 51*a*, 51*b* is obtained, the magnetic flux is different, and thus, the transmitted torque is changed accordingly. Therefore, the magnetically conductive element 50 may be properly designed and controlled so as to change the variable-speed ratio, and change the transmitted torque.

The magnetically conductive elements 40, 50 of FIGS. 4A and 7A also adopt a plurality of annular (cylindrical) permeable rings (that is, the first ring 42, 52 and the like) overlapping each other in a radial direction, and the number of the permeable rings may vary depending on practical design requirements, that is, three or five permeable rings may be combined together, but the disclosure is not limited thereto. The size, arrangement and number of the permeable blocks in the permeable rings may also be properly designed so as to generate different numbers of magnetic gaps, thereby achieving the required variable-speed ratio.

FIG. 8 is a schematic view of a third embodiment of a magnetically conductive element of the magnetic transmission assembly according to the disclosure. The permeable element 60 (or called as magnetically conductive element) comprises a first ring 62 and a second ring 64. The first ring 62 and the second ring 64 are axially connected. The permeable element 60 is disposed between the stator 30 and the rotor 20. The first ring 62 and the second ring 64 are capable of moving axially into the gap between the stator 30 and the rotor 20, such that only one of the first ring 62 and the second ring 64 is sandwiched between the stator 30 and the rotor 20 at a time. In short, when the permeable element 60 is axially actuated, the permeable element 60 selectively enables the first ring 62 or the second ring 64 to be moved to a position between the rotor 20 and the stator 30. As such, the sandwiched first ring 62 or second ring 64 can interact with magnetic fields of the stator 30 and the rotor 20 to generate a particular variable-speed ratio. The number of permeable blocks 63 of the first ring 62 (for example, PN1 permeable blocks) is different from the number of permeable blocks 65 of the second ring 64 (for example, PN2 permeable blocks). In the embodiment of FIG. 8, the number of the permeable blocks 63 of the first ring 62 is 32, and the number of the permeable blocks 65 of the second ring 64 is 24, that is, the permeable element 60 is suitable for replacing the permeable element 40 in the embodiment of FIG. 1. In this embodiment, the permeable blocks 63, 65 respectively form and are equivalent to the permeable regions 46*a*, 46*b* in FIGS. 4B and 4C.

As mentioned above, the first ring 62 and the second ring 64 are axially connected. Please refer to FIG. 8 again. The first ring 62 and the second ring 64 are axially connected to each other through an electrical insulating element 66*a*. In addition, two electrical insulating elements 66*b*, 66*c* are respectively connected to the two outer sides of the first ring 62 and the second ring 64 for fixing the permeable blocks 65 of the second ring 64 and the permeable blocks 63 of the first ring 62.

Figure 9:
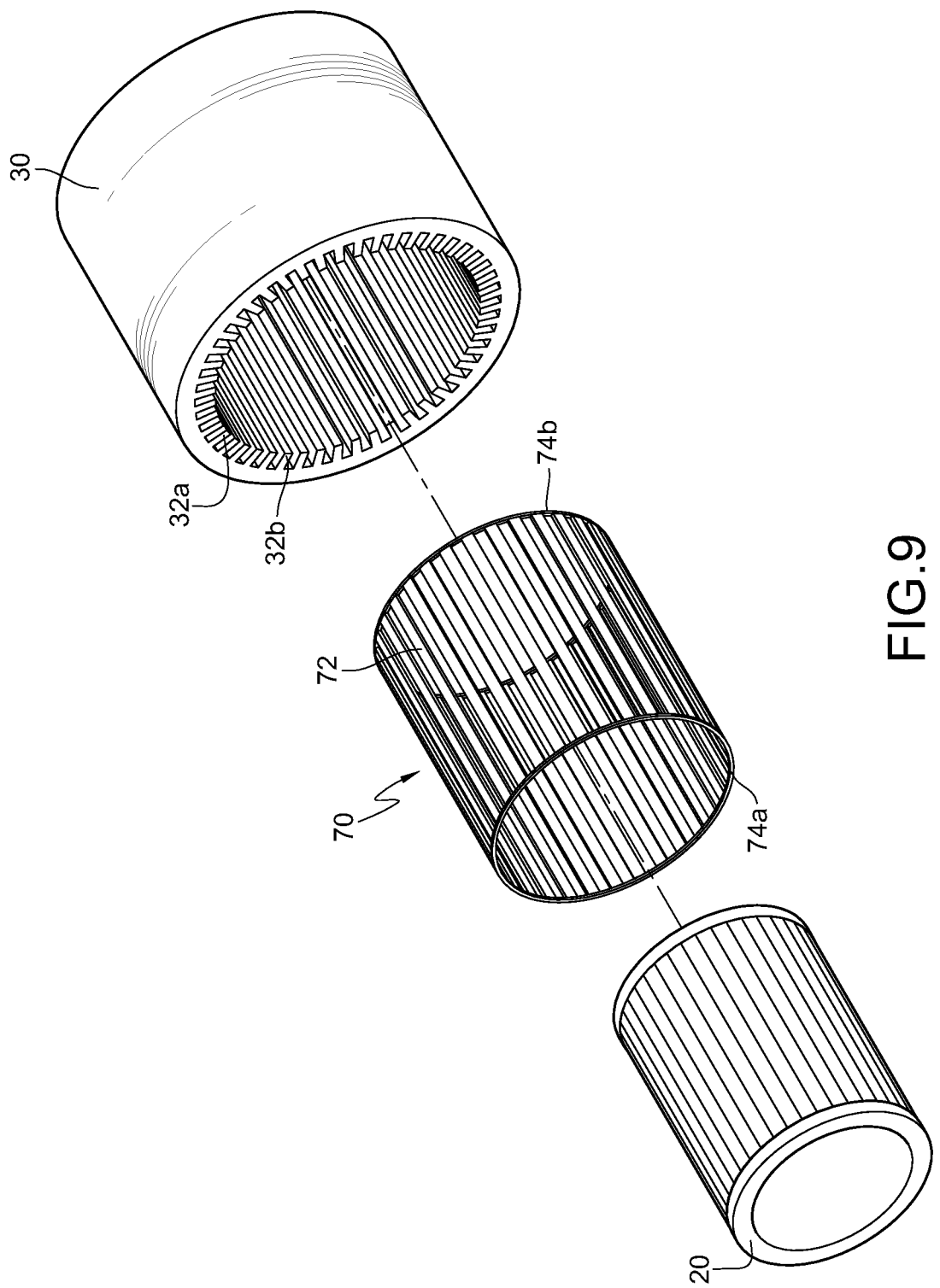
FIG. 9 is a three-dimensional schematic exploded view of a second embodiment of the magnetic transmission assembly according to the disclosure.

Furthermore, please refer to FIG. 9. FIG. 9 is a three-dimensional schematic exploded view of a second embodiment of the magnetic transmission assembly according to the disclosure. As can be seen from the figure, a magnetic transmission assembly comprises a rotor 20, a stator 30, and a permeable element 70. The rotor 20 has a plurality of poles and the poles of the rotor 20 have R pole pairs. The stator 30 is sleeved coaxially with the rotor 20 and has a plurality of poles. The poles of the stator 30 have ST1 pole pairs. The permeable element 70 is disposed between the rotor 20 and the stator 30 and has PN1 permeable regions 72. The PN1 permeable regions 72 correspond to the rotor and the stator. PN1−3≦R+ST1≦PN1+3. Accordingly, if R is 20, PN1 is 32 and ST1 is 12, the acceleration ratio or deceleration ratio would be 1.6:1 according to the above Equation (1).

Next, the two ends of the permeable regions 72 are fixed by two electrical insulating elements 74*a*, 74*b* as shown in FIG. 9. By means of disposition of the electrical insulating elements 74*a*, 74*b*, the induced current generated by the permeable regions 72 cutting the magnetic fields of the rotor 20 and the stator 30 is insulated within each of the permeable regions 72.

According to the embodiment in FIG. 9, the permeable element 70, the stator 30 and the rotor 20 each have a hollow annular shape, such that the entire magnetic transmission assembly has small volume and weight, and can be easily integrated into an electric motor. Consequently, the drive power density (W/Kg or W/m³) of the integrated motor is increased.

According to the above embodiments, through different implementations of the permeable elements 40, 50, 60, the magnetic transmission assembly can switch to different variable-speed ratios. Then, if the number of the permeable regions 46a, 46b, 51a, 51b, 51c, 51d of the permeable elements 40, 50, 60 that can be switched cannot satisfy the Equations (2) and (3), the implementation of the stator 30 of FIG. 5A may be adopted (the Equations (2) and (4) are satisfied), such that the stability under different variable-speed ratios can be improved.

Furthermore, the above Equations (2), (3), and (4) are relational expressions based on the fundamental harmonics of the stator 30, and if the number of pole pairs of the stator 30 in the relational expressions is designed using higher-order permeance harmonics, the following relational expressions can be obtained:

$$PN1-3 \leq R+ST1' \leq PN1+3 \quad \text{Equation (5)}$$

$$PN1-3 \leq R+ST1' \leq PN1+3 \quad \text{Equation (6)}$$

$$PN1-3 \leq R+ST1' \leq PN1+3 \quad \text{Equation (7)}$$

In the equations, ST1' and ST2' are respectively the number of pole pairs of higher-order permeance harmonics of the stator 30. For example, if the number of pole pairs of the fundamental harmonics of the stator 30 is 4, the number of pole pairs of the third permeance harmonics is 12. Therefore, a wider range for selection is permitted when designing the number R of the pole pairs of the rotor 20 and the numbers PN1 and PN2 of the permeable regions 46a, 46b of the permeable element 40.

In addition, in the above relational expressions, the magnetic field generated by the stator may be designed to be in synchronization with or not in synchronization with the number R of the pole pairs of the rotor and the permeable regions 46a, 46b of the permeable element 40. Definitely, switching between synchronization and asynchronization can also be achieved by controlling the number of pole pairs of the stator 30 and/or the permeable element 40.

Figure 10A:
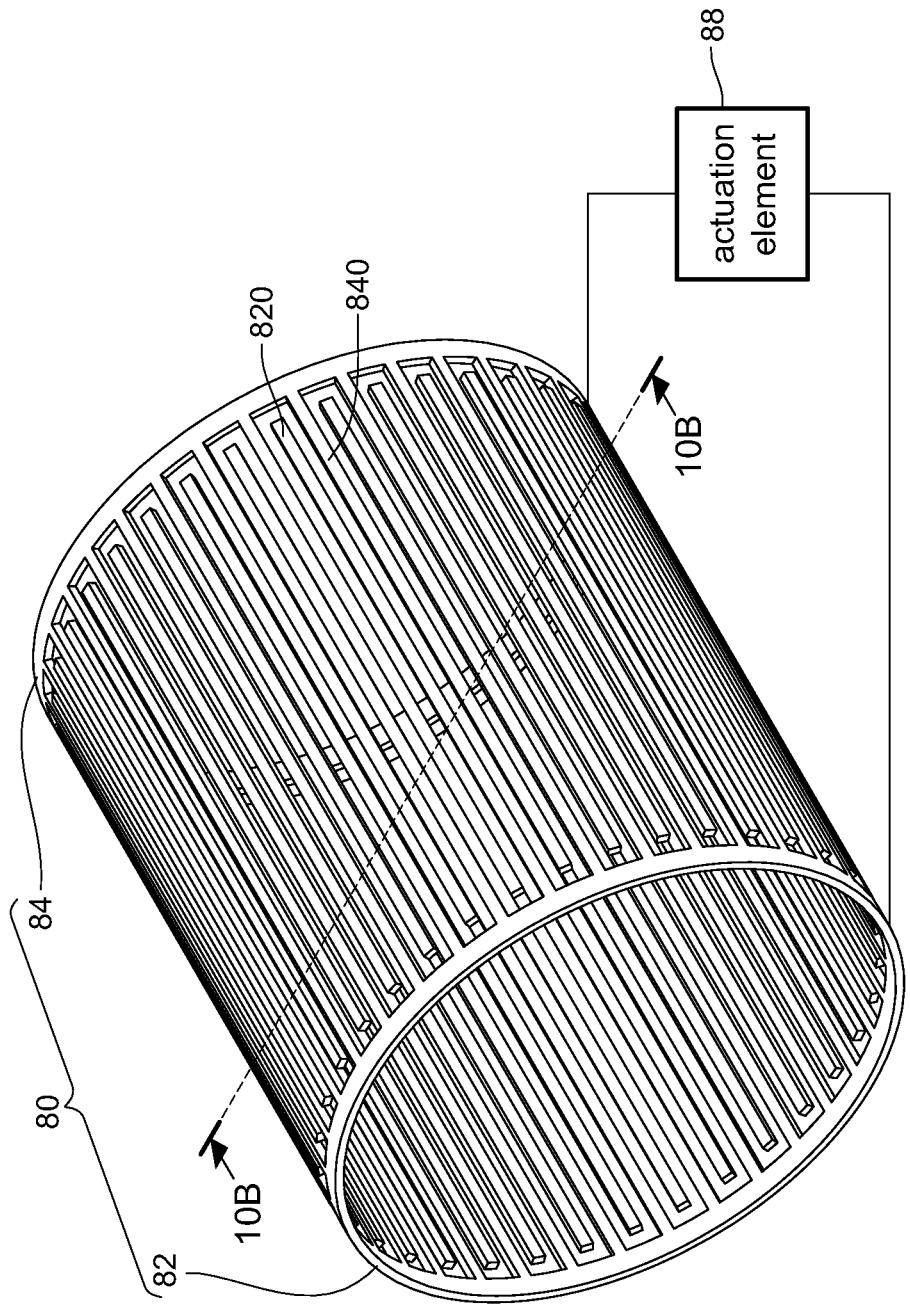
FIG. 10A is a schematic view of a fourth embodiment of the magnetically conductive element of the magnetic transmission assembly according to the disclosure.
Figure 10B:
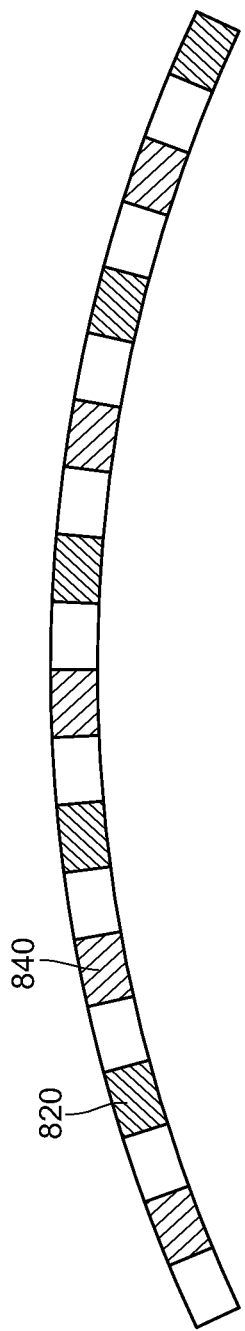
FIGS. 10B and 10C are respectively a partial cross-sectional view of FIG. 10A along Line 10B-10B and a schematic state diagram.
Figure 10C:
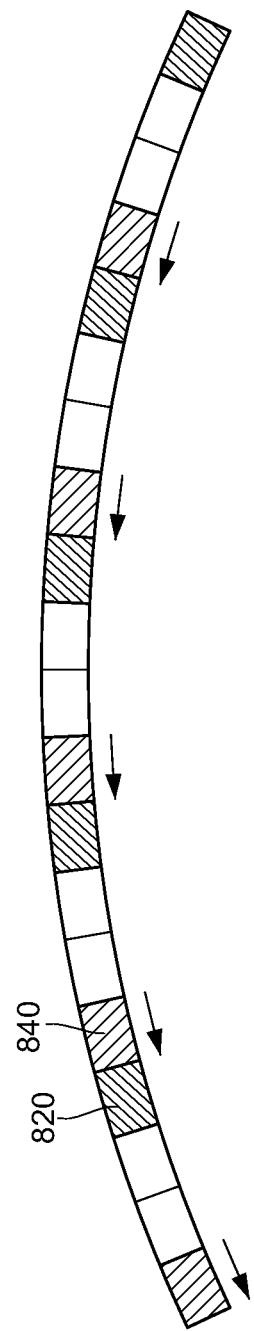

FIGS. 10A, 10B, and 10C are respectively a schematic view of a fourth embodiment of the permeable element of the magnetic transmission assembly according to the disclosure, a partial cross-sectional view of FIG. 10A along Line 10B-10B and a schematic view illustrating operation thereof.

As can be seen from the figures, the permeable element 80 comprises a first ring 82 and a second ring 84. The first ring 82 has a plurality of parallel striped permeable blocks 820 arranged annularly (also referred to as first permeable blocks). The second ring 84 also comprises a plurality of parallel striped permeable blocks 840 arranged annularly (also referred to as second permeable blocks). The permeable blocks 820 of the first ring 82 and the permeable blocks 840 of the second ring 84 are alternately disposed in a radial direction and sandwiched between the stator 30 and the rotor 20 (referring to FIG. 1). That is, the permeable blocks 820 of the first ring 82 and the permeable blocks 840 of the second ring 84 are located at identical or close radial positions, which can be seen from FIG. 10B.

FIG. 10B is a partial cross-sectional view of FIG. 10A along Line 10B-10B, similar to the cross-sectional relation between FIG. 4B and FIGS. 2 and 4A. That is, FIG. 10B merely shows a cross-sectional view of a part of arc segments in FIG. 10A.

FIG. 10B shows a state of the first ring 82 and the second ring 84 of the permeable element 80 at a first position. At the first position, the permeable blocks 820, 840 are spaced from each other by a distance, and each of the permeable blocks 820, 840 forms a permeable region. Although the distance described here is equidistant as shown in the figure, the disclosure is not limited thereto, and the distance between the permeable blocks 820, 840 may also be not equidistant, as long as the air gap is formed between every two permeable blocks 820, 840 such that the neighboring permeable blocks 820, 840 do not form the function of the permeable regions.

FIG. 10C shows a state of the first ring 82 and the second ring 84 of the permeable element 80 at a second position. At the second position, two neighboring permeable blocks 820, 840 are adjacent, such that every two adjacent permeable blocks 820, 840 form a permeable region. Here, the term "adjacent" means that the distance between the two permeable blocks 820, 840 is small enough to enable the two neighboring permeable blocks 820, 840 to form a single permeable region.

As can be seen from FIGS. 10B and 10C, the number of permeable regions formed in FIG. 10B is twice the number of permeable regions formed in FIG. 10C. Therefore, the permeable element 80 can be controlled to change the number of permeable regions thereof.

As for an actuation element 88 for controlling the permeable element 80 to change the number of permeable regions thereof (referring to FIG. 10A), an electric motor or a pneumatic valve may be used. The actuation element 88 may also be applied in the embodiments of FIGS. 1, 7A, 8, and 11A. Definitely, the actuation element 88 may also be changed into a fixed type and controlled by manual toggling.

Figure 11A:
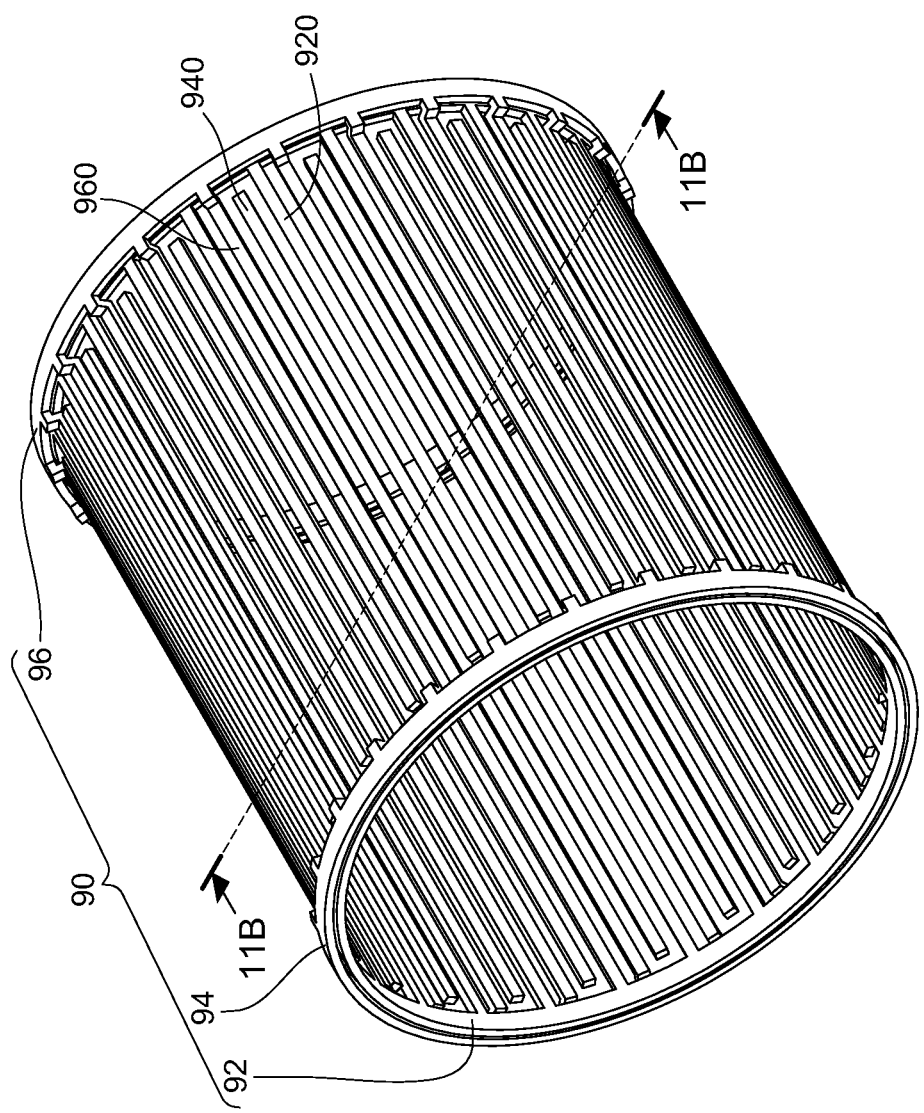
FIG. 11A is a schematic view of a fourth embodiment of the magnetically conductive element of the magnetic transmission assembly according to the disclosure.

FIGS. 11A, 11B, and 11C are respectively a schematic view of the fourth embodiment of the permeable element of the magnetic transmission assembly according to the disclosure, a partial cross-sectional view of FIG. 11A along Line 11B-11B and a schematic view illustrating operation thereof. The illustration of the figures is similar to that of FIGS. 10A, 10B, and 10C, such that the details will not be described herein again.

As can be seen from the figures, the fourth embodiment of the permeable element 80 comprises a first ring 92, a second ring 94, and a third ring 96. The first ring 92, the second ring 94, and the third ring 96 respectively have a plurality of permeable blocks 920, 940, 960 (also respectively referred to as first, second, and third permeable blocks). The first permeable blocks 920, the second permeable blocks 940, and the third permeable blocks 960 are sequentially disposed in a radial direction and sandwiched between the stator 30 and the rotor 20. The permeable blocks 920, 940, 960 are located at identical or close radial positions (that is, at approximately the same distance away from the center of circle). Therefore, when the first ring 92, the second ring 94, and the third ring 96 are located at a first position of FIG. 11B, the permeable blocks 920, 940, 960 respectively form an independent permeable region, such that the permeable element 90 has PN1 permeable regions. When the first ring 92, the second ring 94, and the third ring 96 are located at a second position of FIG. 11C, three neighboring permeable blocks 920, 940, 960 are adjacent and form a permeable region, such that the permeable element 90 has PN2 permeable regions. Therefore, the number PN1 of the permeable regions formed by the permeable element 90 at the first position is three times the number PN2 of the permeable regions formed at the second position.

FIG. 11D is a schematic view of the first ring 92, the second ring 94, and the third ring 96 at a third position. As can be seen from the figure, the permeable blocks 960 of the third ring 96 and the permeable blocks 940 of the second ring 94 are adjacent, and the permeable blocks 920 of the first ring 92 are not adjacent to (or do not approach or contact) the (second and third) permeable blocks 940, 960. Therefore, the adjacent permeable blocks 940, 960 form a permeable region, and the (first) permeable blocks 920 independently form a permeable region, such that the permeable element 90 has PN3 permeable regions. Therefore, the number PN3 of the permeable regions formed in FIG. 11D is twice the number PN2 of the permeable regions formed in FIG. 11C. Here, PN3 can satisfy the following Equation (5):

$$PN3-3 \leq R+ST1 \leq PN3+3 \qquad \text{Equation (8)}$$

Furthermore, the objective of power transmission can also be achieved by arranging the relative positions of the first ring 92, the second ring 94, and the third ring 96 in a non-equidistant manner such that the arc length occupied by the permeable regions and the arc length occupied by the magnetic gaps are not the same, except that the transmitted torque will also be changed.

As for the relation between m and k in the above Equation (1), in addition to m=−k=1, m=k=1 may also be adopted. As such, the relational expressions of the number ST1 of the pole pairs of the stator 30, the number R of the pole pairs of the rotor 20, and the numbers PN1 and PN2 of the permeable regions 46a, 46b of the permeable element 40 need to be adjusted. When the number R of the pole pairs of the rotor 20 is larger than the number ST1 of the pole pairs of the stator 30, the relational expressions are as follows:

$$R-3 \leq PN1+ST1 \leq R+3 \qquad \text{Equation (9)}$$

$$R-3 \leq PN2+ST1 \leq R+3 \qquad \text{Equation (10)}$$

$$R-3 \leq PN3+ST1 \leq R+3 \qquad \text{Equation (11)}$$

$$PN3-3 \leq R+ST1 \leq PN3+3, \text{ or } R-3 \leq PN3+ST1 \leq R+3, \text{ or } ST1-3 \leq PN3+R \leq ST1+3.$$

When the number R of the pole pairs of the rotor 20 is smaller than the number ST1 of the pole pairs of the stator 30, the relational expressions are as follows:

$$ST1-3 \leq PN1+R \leq ST1+3 \qquad \text{Equation (12)}$$

$$ST1-3 \leq PN1+R \leq ST1+3 \qquad \text{Equation (13)}$$

$$ST1-3 \leq PN1+R \leq ST1+3 \qquad \text{Equation (14)}$$

The numbers ST1 and ST2 of the pole pairs of the stator in the above Equation (9) to Equation (14) may respectively replace the number ST1' or ST2' of the pole pairs of higher-order permeance harmonics (that is, replace ST1, ST2 in Equation (5) to Equation (7) with ST1', ST2').

Finally, an application of the magnetic transmission assembly according to the disclosure to a split phase or electromagnetic variable-speed motor will be illustrated below. A variable-speed ratio obtained by the split phase motor is larger than 1, and a variable-speed ratio obtained by the electromagnetic variable-speed motor may be larger than or smaller than 1.

Figure 12:
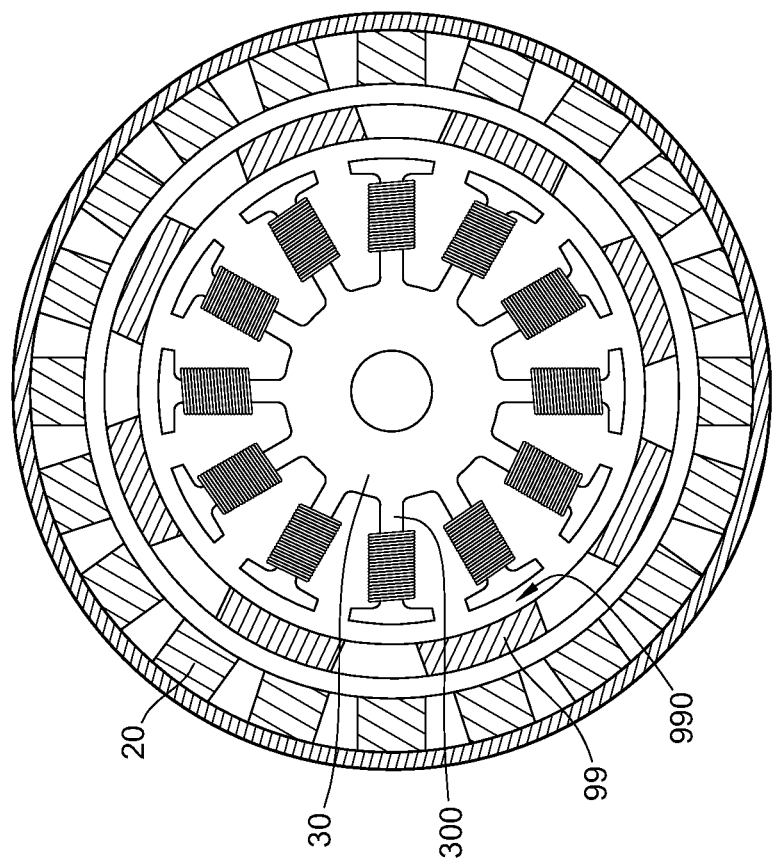
FIG. 12 is a schematic structural view of a split phase motor applying the disclosure.

Please refer to FIG. 12. As can be seen from the figure, the stator 30 is located on a radial inner side of the rotor 20, and the permeable element 99 is located between the stator 30 and the rotor 20. The stator 30 has winding arms 300, and as can be seen from the figure, the stator 30 has 12 winding arms 300 in total. When a conventional split phase or electromagnetic variable-speed motor is used, reference needs to be made to a winding chart (or referred to as a split phase winding chart) as shown by the following table, but the winding chart is not intended to limit the scope of the disclosure.

| # of magnet poles | Number of stator arms (or referred to as number of stator pole pairs × 2) | | | | Deceleration ratio |
|---|---|---|---|---|---|
| | 3 | 6 | 9 | 12 | |
| 2 | ABC | AbCaBc | AacBBaCCb | AAccBBaaCCbb | 1:1 |
| 4 | ABC | ABCABC | ABaCAcBCb | AcBaCbAcBaCb | 2:1 |
| 6 | None | None | ABCABCABC | None | 3:1 |
| 8 | ABC | ABCABC | AaABbBCcC | ABCABCABCABC | 4:1 |
| 10 | ABC | AbCaBc | AaABbBCcC | AabBCcaABbcC A-b-C-a-B-c | 5:1 |
| 12 | None | None | ABCABCABC | None | 6:1 |
| 14 | ABC | AcBaCb | ACaBAbCBc | AacCBbaACcbB A-b-C-a-B-c | 7:1 |
| 16 | ABC | ABCABC | AAbCCaBBc | ABCABCABCABC | 8:1 |
| 18 | None | None | None | None | 9:1 |
| 20 | ABC | ABCABC | AbbCaaBcc | AbCaBcAbCaBc | 10:1 |

| # of magnet poles | Number of stator arms (or referred to as number of stator pole pairs × 2) | | Deceleration ratio |
|---|---|---|---|
| | 15 | 18 | |
| 2 | AAACCbbbaaCCCbb | AAAcccBBBaaaCCCbbb | 1:1 |
| 4 | AAcBaCCbAcBBaCb | AAcBBaCCbAAcBBaCCb | 2:1 |
| 6 | None | AcBaCbAcBaCbAcBaCb | 3:1 |
| 8 | AcaCABabABCbcBc | ABaCAcBCbABaCAcBCb | 4:1 |
| 10 | ABCABCABCABCABC | AcabABCbcaCABabcBC | 5:1 |
| 12 | None | ABCABCABCABCABC AaBbCcAaBbCcAaBbCc A-B-C-A-B-C-A-B-C | 6:1 |
| 14 | AaAaABbBbBCcCcC | AabcCABbcaABCcabBC | 7:1 |
| 16 | AaAaAcCcCcCBbBbB | AaABbBCcCAaABbBCcC | 8:1 |
| 18 | None | None | 9:1 |
| 20 | ABCABCABCABCABC | AaABbBCcCAaABbBCcC | 10:1 |

When the winding chart is applied in a structure not having the permeable element 99 according to the disclosure (that is, the structure with the permeable element 99 removed in FIG. 12), the winding mode required by the winding arms 300 of the stator 30 and the resulting variable-speed ratio can be obtained. As shown in the figure, A, B, C respectively represent a first phase winding mode, a second phase winding mode, and a third phase winding mode, and a, b, c respectively represent a winding mode reverse to the first phase, a winding mode reverse to the second phase, and a winding mode reverse to the third phase. In the structure not using the permeable element 99, if the number of magnetic poles of the rotor is 4, the number of the winding arms 300 of the stator 30 is 9, and an ABaCAcBCb winding mode is used, a deceleration ratio of 2:1 can be obtained.

Here, each letter in ABaCAcBCb represents a winding mode of a winding arm 300, and is configured clockwise or anticlockwise according to the winding arms of the stator 30. Taking the ABaCAcBCb winding mode as an example, a first winding arm 300 adopts the first phase winding mode (A), a second winding arm 300 adopts the second phase winding mode, a third winding arm 300 adopts the winding mode (a) reverse to the first phase, a fourth winding arm 300 adopts the third phase winding mode (C), and so on. The first, second, third, and fourth winding arms 300 are sequentially neighboring winding arms 300 clockwise on the stator 30.

Referring to the application of FIG. 12 again, the stator 30 has 12 winding arms 300, and if each winding arm 300 is independently wound with a coil, and neighboring winding arms 300 are wound with coils of different phases, the stator 30 has 12 magnetic poles, that is, the number ST1 of the pole pairs of the stator 30 is 6 (the number of magnetic poles is twice the number of pole pairs). The number R of the pole pairs of the rotor 20 is 10 (that is, the number of magnetic poles is 20). The number PN1 of the permeable regions of the permeable element 99 is 8. Therefore, it can be known according to the following Equation (15) that the number R2 of stator-side pole pairs in a gap 990 between the permeable element 99 and the stator 30 is 2. Therefore, the number of stator-side magnetic poles is 4.

$$R2=|R-PN1|  \quad \text{Equation (15)}$$

Then, the winding chart is looked up using the number of stator-side magnetic poles being 4 and the number of magnetic poles of the winding arms 300 of the stator being 12, and it can be obtained that the winding mode is AcBaCbAcBaCb. Therefore, a deceleration ratio of 2:1 can be obtained between the permeable element 99 and the stator 30. In addition, a deceleration ratio between the rotor 20 and the permeable element 99 is 5 (R/R2=10/2=5). Therefore, the overall deceleration ratio of the split phase motor of FIG. 12 will reach 10:1 (that is, 2:1×5:1).

In addition, if every two neighboring winding arms 300 in the stator 30 are considered as one winding arm wounded with coils of the same phase, the stator 30 has 6 magnetic poles, thereby increasing the variability.

Moreover, if the permeable element 99 is actuated such that the number of permeable regions thereof is changed to 6 (PN2), the number of stator-side pole pairs is 4 (applying the Equation (15)), and thus, when the winding chart is used, the number of magnetic poles is 8, and different deceleration ratios can be generated.

Furthermore, the Equation (15) for calculating the number of stator-side pole pairs may also be changed into the following Equation (16).

$$R2=R+PN1 \quad \text{Equation (16)}$$

The coils of the stator of the motor may be driven (or activiated) by AC current (as a synchromotor), or may be driven by a square wave or sine wave generated by Pulse Width Modulation (PWM) (as a brushless AC motor).

Based on the above, since the magnetic transmission assembly in the embodiments comprises a design of a stator and a rotor of an electric motor or a generator, has a design of a transmission structure, and is easily integrated with a motor driver of the electric motor or an electricity generating circuit (for example, a rectification and voltage regulation voltage or the like) of the generator to form a variable speed electric motor or a variable speed generator. The integrated variable speed electric motor has both a function of generating a rotary power and a function of variable speed transmission, but the volume and weight thereof are only about the original volume and weight of the electric motor, such that a high drive power density is achieved. Meanwhile, the magnetic transmission assembly adopts electromagnetic transmission, and thus has reduced vibration and noise level. Furthermore, when applied in the industry of electric automobiles, the variable speed electric motor can meet the requirements of different torques and travel speeds while maintaining high performance operation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the disclosure pertains without departing from its spirit and scope. Accordingly, the scope of the disclosure is defined by the appended claims rather than the foregoing description and the exemplary embodiments described therein.

What is claimed is:

1. A magnetic transmission assembly, comprising:
   a rotor, having a plurality of poles, wherein the poles of the rotor have R pole pairs;
   a stator, sleeved coaxially with the rotor, and having a plurality of poles, wherein the poles of the stator have ST1 pole pairs; and
   a magnetically conductive element, disposed between the rotor and the stator, and having a plurality of permeable regions, wherein the magnetically conductive element comprises both PN1 and PN2 permeable regions, when the magnetically conductive element is actuated, the magnetically conductive element selectively enables the PN1 or the PN2 permeable regions to be corresponding to the rotor and the stator, and $R-3 \leqq PN1+ST1 \leqq R+3$, or $ST1-3 \leqq PN1+R \leqq ST1+3$.

2. The magnetic transmission assembly according to claim 1, wherein—$PN2-3 \leqq R+ST1 \leqq PN2+3$, or $R-3 \leqq PN2+ST1 \leqq R+3$, or $ST1-3 \leqq PN2+R \leqq ST1+3$.

3. The magnetic transmission assembly according to claim 1, wherein the magnetically conductive element comprises a first ring and a second ring, the first ring and the second ring are axially connected, the first ring has PN1 permeable blocks, the second ring has PN2 permeable blocks, and when the magnetically conductive element is axially actuated, the magnetically conductive element selectively enables the first ring or the second ring to be moved to a position between the rotor and the stator.

4. The magnetic transmission assembly according to claim 1, wherein the magnetically conductive element comprises a first ring and a second ring, the first ring is located on a radial outer side of the second ring, the first ring and the second ring are disposed between the stator and the rotor, when the magnetically conductive element is actuated, the first ring and the second ring move relatively between a first position and a second position, when the first ring and the second ring are located at the first position, the magnetically conductive element has PN1 permeable regions, and when the first ring and the second ring are located at the second position, the magnetically conductive element has PN2 permeable regions.

5. The magnetic transmission assembly according to claim 4, wherein the first ring has a plurality of first permeable blocks, the second ring has a plurality of second permeable blocks, when the first ring and the second ring are located at the first position, every neighboring two of the first permeable blocks and the second permeable blocks form one of the PN1 permeable regions, and when the first ring and the second ring are located at the second position, the first permeable blocks and the second permeable blocks respectively form one of the PN2 permeable regions.

6. The magnetic transmission assembly according to claim 1, wherein the stator comprises a plurality of induction coils, and the induction coils are energized to form the poles.

7. The magnetic transmission assembly according to claim 6, wherein the stator further comprises a pole number modulation circuit, and the pole number modulation circuit selectively switches the induction coils to the ST1 pole pairs and ST2 pole pairs.

8. The magnetic transmission assembly according to claim 7, wherein the stator further comprises a plurality of annularly disposed bumps, the induction coils are respectively wound about the bumps, when the induction coils are switched to the ST1 pole pairs, the neighboring induction coils have opposite polarities, and when the induction coils are switched to the ST2 pole pairs, the induction coils are grouped into a plurality of coil groups, and the neighboring coil groups have opposite polarities.

9. The magnetic transmission assembly according to claim 8, wherein $PN2-3 \leq R+ST2 \leq PN2+3$.

10. The magnetic transmission assembly according to claim 8, wherein each of the coil groups comprises three sequentially neighboring induction coils.

11. The magnetic transmission assembly according to claim 8, wherein the magnetically conductive element comprises a first ring and a second ring, the first ring and the second ring are axially connected, the first ring has PN1 permeable blocks, the second ring has PN2 permeable blocks, and when the magnetically conductive element is axially actuated, the magnetically conductive element selectively enables the first ring or the second ring to be moved to a position between the rotor and the stator.

12. The magnetic transmission assembly according to claim 8, wherein the magnetically conductive element comprises a first ring and a second ring, the first ring and the second ring are in radial contact and are sandwiched between the stator and the rotor, when the magnetically conductive element is actuated, the first ring and the second ring move relatively between a first position and a second position, when the first ring and the second ring are located at the first position, the magnetically conductive element has PN1 permeable regions, and when the first ring and the second ring are located at the second position, the magnetically conductive element has PN2 permeable regions.

13. The magnetic transmission assembly according to claim 1, wherein the magnetically conductive element comprises a first ring and a second ring, the first ring has a plurality of annularly disposed first permeable blocks, the second ring has a plurality of annularly disposed second permeable blocks, the first permeable blocks and the second permeable blocks are alternately disposed in a radial direction and sandwiched between the stator and the rotor, when the magnetically conductive element is actuated, the first ring and the second ring move relatively between a first position and a second position, when the first ring and the second ring are located at the first position, every neighboring two of the first permeable blocks and the second permeable blocks form one of the PN1 permeable regions, and when the first ring and the second ring are located at the second position, the first permeable blocks and the second permeable blocks respectively form one of the PN2 permeable regions.

14. The magnetic transmission assembly according to claim 1, wherein the magnetically conductive element comprises a first ring, a second ring, and a third ring, the first ring has a plurality of annularly disposed first permeable blocks, the second ring has a plurality of annularly disposed second permeable blocks, the third ring has a plurality of annularly disposed third permeable blocks, the first permeable blocks, the second permeable blocks, and the third permeable blocks are alternately disposed in a radial direction and sandwiched between the stator and the rotor, when the magnetically conductive element is actuated, the first ring, the second ring, and the third ring move relatively between a first position, a second position, and a third position, when the first ring, the second ring, and the third ring are located at the first position, every neighboring three of the first permeable blocks, the second permeable blocks, and the third permeable blocks form one of the PN1 permeable regions, when the first ring, the second ring, and the third ring are located at the second position, the first permeable blocks, the second permeable blocks, and the third permeable blocks respectively form one of the PN2 permeable regions, and when the first ring, the second ring, and the third ring are located at the third position, every neighboring two of the second permeable blocks and the third permeable blocks form one of PN3 permeable regions, and the first permeable blocks respectively form one of the PN3 permeable regions, wherein $PN3-3 \leq R+ST1 \leq PN3+3$, or $R-3 \leq PN3+ST1 \leq R+3$, or $ST1-3 \leq PN3+R \leq ST1+3$.

15. The magnetic transmission assembly according to claim 1, wherein the material of the magnetically conductive element is a soft magnetic composite (SMC).

16. A magnetic transmission assembly, comprising:
a rotor, having a plurality of poles, wherein the poles of the rotor have R pole pairs;
a stator, sleeved coaxially with the rotor, and having a plurality of poles, wherein the poles of the stator have ST1 pole pairs and ST1' pole pairs of higher-order permeance harmonics; and
a magnetically conductive element, disposed between the rotor and the stator, and having a plurality of permeable regions, wherein the magnetically conductive element comprises both PN1 and PN2 permeable regions, when the magnetically conductive element is actuated, the magnetically conductive element selectively enables the PN1 or the PN2 permeable regions to be corresponding to the rotor and the stator, and $PN1-3 \leq R+ST1' \leq PN1+3$, or $R-3 \leq PN1+ST1' \leq R+3$, or $ST1'-3 \leq PN1+R \leq ST1'+3$.

17. The magnetic transmission assembly according to claim 16, wherein $PN2-3 \leq R+ST1' \leq PN2+3$, or $R-3 \leq PN2+ST1' \leq R+3$, or $ST1'-3 \leq PN2+R \leq ST1'+3$.

18. The magnetic transmission assembly according to claim 16, wherein the magnetically conductive element comprises a first ring and a second ring, the first ring and the second ring are axially connected, the first ring has PN1 permeable blocks, the second ring has PN2 permeable blocks, and when the magnetically conductive element is axially actuated, the magnetically conductive element selectively enables the first ring or the second ring to be moved to a position between the rotor and the stator.

19. The magnetic transmission assembly according to claim 16, wherein the magnetically conductive element comprises a first ring and a second ring, the first ring is located on a radial outer side of the second ring, the first ring and the second ring are disposed between the stator and the rotor, when the magnetically conductive element is actuated, the first ring and the second ring move relatively between a first position and a second position, when the first ring and the second ring are located at the first position, the magnetically conductive element has PN1 permeable regions, and when the first ring and the second ring are located at the second position, the magnetically conductive element has PN2 permeable regions.

20. The magnetic transmission assembly according to claim 19, wherein the first ring has a plurality of first permeable blocks, the second ring has a plurality of second permeable blocks, when the first ring and the second ring are located at the first position, every neighboring two of the first permeable blocks and the second permeable blocks form one of the PN1 permeable regions, and when the first ring and the second ring are located at the second position, the first permeable blocks and the second permeable blocks respectively form one of the PN2 permeable regions.

21. A split phase motor, comprising:
a rotor, having a plurality of poles, wherein the poles of the rotor have R pole pairs;
a stator, sleeved coaxially with the rotor, and having a plurality of poles, wherein the poles of the stator have ST1 pole pairs; and
a magnetically conductive element, disposed between the rotor and the stator, and having PN1 permeable blocks, wherein the permeable blocks correspond to the rotor and the stator and form R2 stator-side pole pairs, wherein $R2=|R-PN1|$ or $R2=R+PN1$, and R2 and ST1 satisfy a split phase winding chart.

22. A magnetic transmission assembly, comprising:
a rotor, having a plurality of poles, wherein the poles of the rotor have R pole pairs;
a stator, sleeved coaxially with the rotor, and having a plurality of poles, wherein the poles of the stator have ST1 pole pairs; and
a magnetically conductive element, disposed between the rotor and the stator, and having PN1 permeable regions, the PN1 permeable regions corresponding to the rotor and the stator, and $R-3 \leq PN1+ST1 \leq R+3$, or $ST1-3 \leq PN1+R \leq ST1+3$.

* * * * *